(12) United States Patent
Yu et al.

(10) Patent No.: US 11,062,457 B2
(45) Date of Patent: Jul. 13, 2021

(54) ROBOTIC SYSTEM WITH AUTOMATED PACKAGE REGISTRATION MECHANISM AND MINIMUM VIABLE REGION DETECTION

(71) Applicant: MUJIN, Inc., Tokyo (JP)

(72) Inventors: Jinze Yu, Tokyo (JP); Jose Jeronimo Moreira Rodrigues, Tokyo (JP); Rosen Nikolaev Diankov, Tokyo (JP); Xutao Ye, Tokyo (JP)

(73) Assignee: MUJIN, Inc., Tokyo (JP)

( * ) Notice: Subject to any disclaimer, the term of this patent is extended or adjusted under 35 U.S.C. 154(b) by 28 days.

(21) Appl. No.: 16/667,822

(22) Filed: Oct. 29, 2019

(65) Prior Publication Data

US 2020/0134830 A1     Apr. 30, 2020

Related U.S. Application Data

(60) Provisional application No. 62/752,756, filed on Oct. 30, 2018, provisional application No. 62/852,963, filed on May 24, 2019.

(51) Int. Cl.
    *G06K 9/00*      (2006.01)
    *G06T 7/13*      (2017.01)
    (Continued)

(52) U.S. Cl.
    CPC ............... *G06T 7/13* (2017.01); *B25J 9/1676* (2013.01); *B25J 9/1687* (2013.01); *B25J 9/1697* (2013.01);
    (Continued)

(58) Field of Classification Search
    CPC .... G06T 7/13; G06T 7/62; G06T 7/50; G06T 7/11; G06T 7/73; G06T 2200/04;
    (Continued)

(56) References Cited

U.S. PATENT DOCUMENTS 4,907,169 A    3/1990   Lovoi
5,812,395 A *   9/1998   Masciangelo .......... B25J 9/1697
                                                                                                   187/222

(Continued)

FOREIGN PATENT DOCUMENTS

CN           1293752 A      5/2001
CN           1135201 C      1/2004
(Continued)

OTHER PUBLICATIONS

Fast Edge-Based Detection and Localization of Transport Boxes and Pallets in RGB-D Images for Mobile Robot Bin Picking, Dirk Holz et al., ISR 2016 (Jun. 21-22, 2016, Munich, Germany), pp. 133-140 (Year: 2016).*

(Continued)

*Primary Examiner* — Jayesh A Patel
(74) *Attorney, Agent, or Firm* — Perkins Coie LLP

(57) ABSTRACT

The present disclosure relates to methods and systems for generating a verified minimum viable range (MVR) of an object. An exposed outer corner and exposed edges of an object may be identified by processing one or more image data. An initial MVR may be generated by identifying opposing parallel edges opposing the exposed edges. The initial MVR may be adjusted, and the adjusted result may be tested to generate a verified MVR.

20 Claims, 11 Drawing Sheets

(51) Int. Cl.

| | | |
|---|---|---|
| *B25J 9/16* | (2006.01) | |
| *G06T 7/73* | (2017.01) | |
| *G06T 7/50* | (2017.01) | |
| *G06T 7/62* | (2017.01) | |
| *B65G 61/00* | (2006.01) | |
| *G05B 19/4093* | (2006.01) | |
| *G06Q 10/08* | (2012.01) | |
| *G06T 19/20* | (2011.01) | |
| *G06T 7/11* | (2017.01) | |
| *B65B 43/46* | (2006.01) | |
| *G06K 9/32* | (2006.01) | |

(52) U.S. Cl.
CPC .............. *B65B 43/46* (2013.01); *B65G 61/00* (2013.01); *G05B 19/40935* (2013.01); *G06K 9/00201* (2013.01); *G06K 9/3233* (2013.01); *G06Q 10/087* (2013.01); *G06T 7/11* (2017.01); *G06T 7/50* (2017.01); *G06T 7/62* (2017.01); *G06T 7/73* (2017.01); *G06T 19/20* (2013.01); *G05B 2219/40006* (2013.01); *G05B 2219/40607* (2013.01); *G06T 2200/04* (2013.01); *G06T 2207/10028* (2013.01); *G06T 2207/20164* (2013.01); *G06T 2207/30108* (2013.01)

(58) Field of Classification Search
CPC . G06T 2207/10028; G06T 2207/20164; G06T 2207/30108; G06K 9/00201; G06K 9/3233
See application file for complete search history.

(56) References Cited

U.S. PATENT DOCUMENTS

| | | | | |
|---|---|---|---|---|
| 6,290,454 | B1 * | 9/2001 | Huang | B65G 47/90 |
| | | | | 294/119.1 |
| 7,646,917 | B2 * | 1/2010 | Jung | G06K 9/2036 |
| | | | | 382/199 |
| 9,050,719 | B2 | 6/2015 | Valpola et al. | |
| 9,067,744 | B2 | 6/2015 | Takizawa et al. | |
| 9,102,055 | B1 * | 8/2015 | Konolige | B65G 47/50 |
| 9,227,323 | B1 | 1/2016 | Konolige | |
| 9,233,470 | B1 * | 1/2016 | Bradski | B25J 9/1694 |
| 9,272,417 | B2 * | 3/2016 | Konolige | B25J 15/0616 |
| 9,486,921 | B1 | 11/2016 | Straszheim et al. | |
| 9,630,320 | B1 * | 4/2017 | Konolige | B65G 41/008 |
| 9,757,858 | B2 * | 9/2017 | Eto | B25J 15/0616 |
| 9,796,540 | B1 | 10/2017 | Shellenbaum et al. | |
| 9,862,093 | B2 * | 1/2018 | Bradski | G06T 17/00 |
| 10,124,489 | B2 * | 11/2018 | Chitta | B65G 61/00 |
| 10,328,578 | B2 * | 6/2019 | Holz | B66F 9/063 |
| 10,369,701 | B1 * | 8/2019 | Diankov | B25J 15/0616 |
| 10,562,188 | B1 | 2/2020 | Diankov et al. | |
| 10,562,189 | B1 | 2/2020 | Diankov et al. | |
| 10,614,340 | B1 * | 4/2020 | Yu | G06T 7/64 |
| 10,625,952 | B1 * | 4/2020 | Luthra | B07C 5/16 |
| 10,703,584 | B2 * | 7/2020 | Diankov | G06K 9/3241 |
| 2002/0106273 | A1 | 8/2002 | Huang et al. | |
| 2007/0177011 | A1 * | 8/2007 | Lewin | B62D 15/0285 |
| | | | | 348/118 |
| 2009/0028686 | A1 | 1/2009 | Tallis et al. | |
| 2010/0222915 | A1 * | 9/2010 | Kuehnemann | B65G 61/00 |
| | | | | 700/217 |
| 2011/0216185 | A1 * | 9/2011 | Laws | B66F 9/063 |
| | | | | 348/121 |
| 2011/0218670 | A1 * | 9/2011 | Bell | B66F 9/20 |
| | | | | 700/215 |
| 2015/0066199 | A1 | 3/2015 | Shimono | |
| 2015/0203304 | A1 | 7/2015 | Morency et al. | |
| 2015/0262012 | A1 | 9/2015 | Kim et al. | |
| 2016/0016311 | A1 | 1/2016 | Konolige et al. | |
| 2017/0057146 | A1 | 3/2017 | Altonen et al. | |
| 2017/0057148 | A1 | 3/2017 | Altonen et al. | |
| 2017/0076469 | A1 | 3/2017 | Sonoura et al. | |
| 2017/0137236 | A1 | 5/2017 | Sonoura et al. | |
| 2017/0246744 | A1 * | 8/2017 | Chitta | B65G 61/00 |
| 2018/0126553 | A1 | 5/2018 | Corkum et al. | |
| 2018/0243904 | A1 | 8/2018 | Bradski | |
| 2018/0304468 | A1 * | 10/2018 | Holz | G06T 7/13 |
| 2020/0130962 | A1 | 4/2020 | Yu et al. | |
| 2020/0130963 | A1 | 4/2020 | Diankov et al. | |
| 2020/0134828 | A1 | 4/2020 | Diankov et al. | |
| 2020/0139553 | A1 | 5/2020 | Diankov et al. | |
| 2020/0294244 | A1 | 9/2020 | Diankov et al. | |
| 2020/0302207 | A1 * | 9/2020 | Perkins | G06T 7/13 |

FOREIGN PATENT DOCUMENTS

| | | | |
|---|---|---|---|
| CN | 1791475 | A | 6/2006 |
| CN | 102616578 | A | 8/2012 |
| CN | 103568024 | A | 2/2014 |
| CN | 103822594 | A | 5/2014 |
| CN | 104608150 | A | 5/2015 |
| CN | 103043359 | A | 7/2015 |
| CN | 105817430 | A | 8/2016 |
| CN | 106063998 | A | 11/2016 |
| CN | 106660207 | A | 5/2017 |
| CN | 106945035 | A | 7/2017 |
| CN | 107889452 | A | 4/2018 |
| CN | 108349083 | A | 7/2018 |
| CN | 111566028 | A | 8/2020 |
| CN | 111629868 | A | 9/2020 |
| DE | 102015106936 | A1 | 11/2015 |
| JP | 03234491 | A | 10/1991 |
| JP | H03234491 | A * | 10/1991 |
| JP | H103234491 | A | 10/1991 |
| JP | H06171760 | A * | 6/1994 |
| JP | H06171760 | A | 6/1994 |
| JP | 07097057 | A | 4/1995 |
| JP | H0797057 | A | 4/1995 |
| JP | H07291450 | A * | 11/1995 |
| JP | H07291450 | A | 11/1995 |
| JP | 10031742 | A | 2/1998 |
| JP | 2894449 | B2 | 5/1999 |
| JP | 2001058723 | A | 3/2001 |
| JP | 2001072247 | A | 3/2001 |
| JP | 2002013913 | A | 1/2002 |
| JP | 2002013913 | A * | 1/2002 |
| JP | 3277739 | A | 4/2002 |
| JP | 2003237943 | A | 8/2003 |
| JP | 3596434 | B2 | 12/2004 |
| JP | 3849514 | B2 | 11/2006 |
| JP | 2006300929 | A | 11/2006 |
| JP | 2007254128 | A | 10/2007 |
| JP | 2010247959 | A * | 1/2010 |
| JP | 2010247959 | A | 11/2010 |
| JP | 2013129034 | A | 7/2013 |
| JP | 2013129034 | A * | 7/2013 |
| JP | 5429614 | B2 | 2/2014 |
| JP | 2017058130 | A | 3/2017 |
| JP | 2017520418 | A | 7/2017 |
| JP | 2017149569 | A | 8/2017 |
| JP | 2018047544 | A | 3/2018 |
| JP | 6374993 | B2 | 8/2018 |
| JP | 6461712 | B2 | 1/2019 |
| JP | 6486114 | B2 | 3/2019 |
| JP | 2019509559 | A | 4/2019 |
| JP | 2019136828 | A | 8/2019 |
| WO | 2017146895 | A1 | 8/2017 |
| WO | WO-2017146895 | A1 * | 8/2017 ............ B25J 9/1687 |
| WO | 2018185861 | A1 | 10/2018 |

OTHER PUBLICATIONS

Real-Time Object Detection, Localization and Verification for Fast Robotic Depalletizing, Dirk Holz et al., 978-1-4799-9994-1, IEEE, 2015, pp. 1459-1466 (Year: 2015).*

A 3D Perception-based Robotic Manipulation System for Automated Truck Unloading, Paul Doliotis at el., 978-1-5090-2409-4, IEEE, 2016, pp. 262-267 (Year: 2016).*

(56) References Cited

OTHER PUBLICATIONS

U.S. Patent Office Non-Final Office Action dated Apr. 18, 2019 for U.S. Appl. No. 16/290,741, filed Mar. 1, 2019, 20 pages.
U.S. Patent Office Notice of Allowance dated Jun. 7, 2019 for U.S. Appl. No. 16/290,741, filed Mar. 1, 2019, 8 pages.
U.S. Patent Office Non-Final Office Action dated Jul. 12, 2019 for U.S. Appl. No. 16/443,743, filed Jun. 17, 2019, 15 pages.
U.S. Patent Office Non-Final Office Action dated Jul. 15, 2019 for U.S. Appl. No. 16/443,757, filed Jun. 17, 2019, 16 pages.
Notice of Allowance dated Oct. 9, 2019 for U.S. Appl. No. 16/443,743, filed Jun. 17, 2019, 12 pages.
Notice of Allowance dated Oct. 7, 2019 for U.S. Appl. No. 16/443,757, filed Jun. 17, 2019, 12 pages.
U.S. Appl. No. 16/539,790, filed Aug. 13, 2019, Inventors: Rosen Diankov, Huan Liu, Xutao Ye, Jose Jeronimo Moreira Rodrigues, Yoshiki Kanemoto, Jinze Yu and Russell Islam, Applicant: MUJIN, Inc.
U.S. Appl. No. 16/667,857, filed Oct. 29, 2019, Inventors: Rosen Nikolaev Diankov, Huan Liu, Xutao Ye, Jose Jeronimo Moreira Rodrigues, Yoshiki Kanemoto, Jinze Yu and Russell Islam, Applicant: MUJIN, Inc.
U.S. Appl. No. 16/667,840, filed Oct. 29, 2019, Inventors: Jinze Yu, Jose Jeronimo Moreira Rodrigues and Rosen Nikolaev Diankov, Applicant: MUJIN, Inc.
U.S. Appl. No. 16/667,882, filed Oct. 29, 2019, Inventors: Jinze Yu, Jose Jeronimo Moreira Rodrigues and Rosen Nikolaev Diankov, Applicant: MUJIN, Inc.
Korean Intellectual Property Office, International Application Division, International Search Report and Written Opinion for PCT/US2019/035608 filed Jun. 5, 2018, dated Aug. 29, 2019, 9 pages.
Japanese Patent Office, Notice of Reasons for Rejection for Japanese Application No. 2019-133517, dated Nov. 18, 2019, with English translation, 6 pages.
U.S. Appl. No. 16/736,667, filed Jan. 7, 2020, Inventors: Rosen Nikolaev Diankov, Huan Liu, Xutao Ye, Jose Jeronimo Moreira Rodrigues, Yoshiki Kanemoto, Jinze Yu and Russell Islam, Applicant: MUJIN, Inc.
International Search Report and Written Opinion dated Feb. 19, 2020 for PCT/US2019/058672 filed Oct. 29, 2019, ISA/KR, 10 pages.
International Search Report and Written Opinion dated Feb. 17, 2020 for PCT/US2019/058650 filed Oct. 29, 2019, ISA/KR, 12 pages.
International Search Report and Written Opinion dated Feb. 19, 2020 for PCT/US2019/058656 filed Oct. 29, 2019, ISA/KR, 9 pages.
International Search Report and Written Opinion dated Feb. 20, 2020 for PCT/US2019/058666 filed Oct. 29, 2019, ISA/KR, 10 pages.
International Search Report and Written Opinion dated Feb. 24, 2020 for PCT/US2019/058677 filed Oct. 29, 2019, ISA/KR, 9 pages.
Non-Final Office Action dated Nov. 14, 2019 for U.S. Appl. No. 16/539,790, filed Aug. 13, 2019, 16 pages.
Notice of Allowance dated Mar. 9, 2020 for U.S. Appl. No. 16/539,790, filed Aug. 13, 2019, 19 pages.
Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.
Japanese Patent Office, Decision to Grant Japanese Application No. 2019-133517, dated Mar. 17, 2020, 3 pages.
Japanese Patent Office, Notice of Reasons for Rejection for Japanese Application No. 2020-516651, dated Nov. 9, 2020, with English translation, 6 pages.
Japanese Patent Office, Notice of Reasons for Rejection for Japanese Application No. 2020-515142, dated Nov. 9, 2020, with English translation, 13 pages.
Japanese Patent Office, Notice of Reasons for Rejection for Japanese Application No. 2020-514759, dated Oct. 28, 2020, with English translation, 6 pages.
Japanese Patent Office, Decision to Grant Japanese Application No. 2020-514759, dated Nov. 27, 2020, 3 pages.
Japanese Patent Office, Notice of Reasons for Rejection for Japanese Application No. 2020-514750, dated Oct. 28, 2020, with English translation, 7 pages.
Japanese Patent Office, Decision to Grant Japanese Application No. 2020-514750, dated Nov. 27, 2020, 3 pages.
Japanese Patent Office, Notice of Reasons for Rejection for Japanese Application No. 2020-501166, dated Oct. 28, 2020, 2 pages.
Japanese Patent Office, Decision to Grant for Japanese Application No. 2020-501166, dated Nov. 12, 2020, 3 pages.
CIPO Office Action dated Jul. 2, 2020 for Application No. 201910597137.2, 5 pages.
CIPO Office Action dated Jan. 7, 2021 for Application No. 201910597137.2, 3 pages.
Japanese Patent Office, Decision to Grant Japanese Application No. 2020-516651, dated Dec. 2, 2020, 3 cages.
Japanese Patent Office, Decision to Grant Japanese Application No. 2020-515142, dated Dec. 7, 2020, 3 pages.
CIPO Office Action dated Feb. 23, 2021 for Application No. 202010416747.0, 6 pages.
Notice of Allowance dated Feb. 10, 2021 for U.S. Appl. No. 16/736,667, filed Jan. 7, 2020, First Inventor Rosen Diankov, 23 pages.
German Patent Office Office Action dated Nov. 18, 2020 for Application No. 112019000125.6, 7 pages.
CIPO Notice to Grant dated Apr. 7, 2021 for Application No. 201910597137.2, 4 pages.
CIPO Office Action dated Apr. 2, 2021 for Application No. 202010482364.3, 9 pages.
CIPO Office Action dated Mar. 3, 2021 for Application No. 202010482376.6, 11 pages.
CIPO Office Action dated Apr. 28, 2021 for Application No. 202010539908.5, 12 pages.
CIPO Office Action dated Mar. 19, 2021 for Application No. 202010539927.8, 7 pages.
CIPO Notice to Grant dated Apr. 13, 2021 for Application No. 202010416747.0, 4 pages.
German Patent Office Decision to Grant dated Mar. 16, 2021 for Application No. 112019000125.6, 6 pages.
Examiner Gregory M. Desire, Non-Final Office Action dated Apr. 13, 2021 for U.S. Appl. No. 16/667,882, Filed Oct. 29, 2019, 23 pages.
CIPO Notice to Grant dated May 20, 2021 for Application No. 202010539927.8, 4 pages.
International Bureau of WIPO, PCT International Preliminary Report on Patentability for PCT/US2019/035608 filed Jun. 5, 2019, dated May 14, 2021, 6 pages.
International Bureau of WIPO, PCT International Preliminary Report on Patentability for PCT/US2019/058672 filed Oct. 29, 2019, dated May 14, 2021, 7 pages.
International Bureau of WIPO, PCT International Preliminary Report on Patentability for PCT/US2019/058650 filed Oct. 29, 2019, dated May 14, 2021, 9 pages.
International Bureau of WIPO, PCT International Preliminary Report on Patentability for PCT/US2019/058656 filed Oct. 29, 2019, dated May 14, 2021, 6 pages.
International Bureau of WIPO, PCT International Preliminary Report on Patentability for PCT/US2019/058666 filed Oct. 29, 2019, dated May 14, 2021, 7 pages.
International Bureau of WIPO, PCT International Preliminary Report on Patentability for PCT/US2019/058677 filed Oct. 29, 2019, dated May 14, 2021, 6 pages.
CIPO Notice to Grant dated May 21, 2021 for Application No. 202010482376.6, 4 pages.

* cited by examiner

ROBOTIC SYSTEM WITH AUTOMATED PACKAGE REGISTRATION MECHANISM AND MINIMUM VIABLE REGION DETECTION

CROSS-REFERENCE TO RELATED APPLICATION(S)

This application claims the benefit of U.S. Provisional Patent Application Ser. No. 62/752,756, filed Oct. 30, 2018, which is incorporated by reference herein in its entirety. This application further claims the benefit of U.S. Provisional Patent Application Ser. No. 62/852,963, filed May 24, 2019, which is incorporated by reference herein in its entirety. This application is also related to U.S. patent application Ser. No. 16/290,741, filed Mar. 1, 2019, now U.S. Pat. No. 10,369,701, and is incorporated by reference in its entirety.

This application contains subject matter related to a concurrently-filed U.S. patent application by Jinze Yu, Jose Jeronimo Moreira Rodrigues, and Rose Nikolaev Diankov titled "A ROBOTIC SYSTEM WITH AUTOMATED PACKAGE REGISTRATION MECHANISM AND AUTO-DETECTION PIPELINE." The related application is assigned to Mujin, Inc. The subject matter thereof is incorporated herein by reference thereto.

TECHNICAL FIELD

The present technology is directed generally to robotic systems and, more specifically, to systems, processes, and techniques for registering objects.

BACKGROUND

In many cases, packages are arranged in pallets (or "palletized") for shipment to a destination, where the packages are subsequently de-palletized. Packages may be de-palletized by human workers, which can be resource-intensive and increase the risk of injury to the human workers. In industrial settings, de-palletizing operations may be performed by industrial robots, such as a robotic arm that grip, lift, transport, and deliver the package to a release point. Also, an imaging device may be utilized to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center of mass) of the imaged objects may be unknown. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
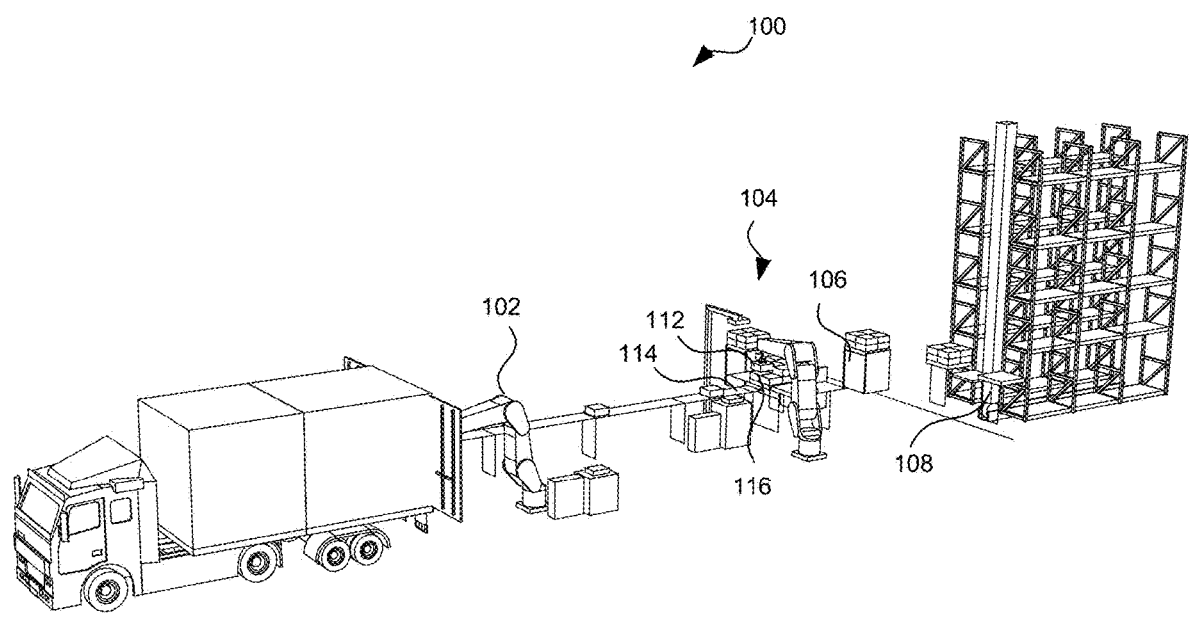
FIG. 1 illustrates an example environment in which a robotic system may operate.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Systems and methods for robotic systems with automated package registration mechanisms are described herein. A robotic system (e.g., an integrated system of devices that executes one or more designated tasks) configured in accordance with some embodiments provides enhanced usability and flexibility by manipulating and/or autonomously/automatically (e.g., with little or no human-operator inputs) registering previously unknown or unrecognized objects (e.g., packages, boxes, cases, etc.).

To determine whether objects are recognized, the robotic system can obtain and compare data regarding objects at a start location (e.g., one or more images of exposed surfaces of the objects) to registration data for known or expected objects. The robotic system can determine an object as being recognized when the compared data (e.g., a portion of the compared image) matches registration data (e.g., one of the registered surface images) for one of the objects. The robotic system can determine an object as being unrecognized when the compared data fails to match the registration data of known or expected objects.

The robotic system can manipulate the unrecognized objects according to one or more estimations and determine additional information (e.g., a surface image and/or physical dimensions) about the unrecognized objects. For example, the robotic system can identify exposed edges and/or exposed outer corners of the unrecognized objects that are separate or non-adjacent to other objects.

The estimation can include generating Minimum Viable Regions (MVRs) the represent minimum and/or optimal areas required to contact and lift the corresponding unrecognized objects. In generating the MVR, exposed outer corner and exposed edges may be identified by inspecting point cloud data. Based on the identified exposed outer corner and exposed edges, an initial MVR may be generated by identifying opposing edges that oppose the exposed edges. As an illustrative example, a pair of exposed edges may be orthogonal to each other and form an exposed outer corner. The initial MVR for such object may extend from the exposed outer corner along to the exposed edges to the identified opposing edges.

In some embodiments, the initial MVR may be further processed, such as by testing potential MVR regions by expanding from the initial MVR to an end of a region defined by the point cloud. A merged MVR of the object may include the initial MVR and the potential MVRs. A verified MVR may be generated when the merged MVR satisfies one or more predetermined conditions. The verified MVR may represent an accurate region that encompasses the unrecognized object. Based on the verified MVR, the system as described herein may register the object and perform a task with respect to the object, such as by gripping and/or moving the object.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (by, e.g., operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, two-dimensional (2D) and/or three-dimensional (3D) imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Object Transfer and Registration with a Destination-Based Sensor

Figure 2:
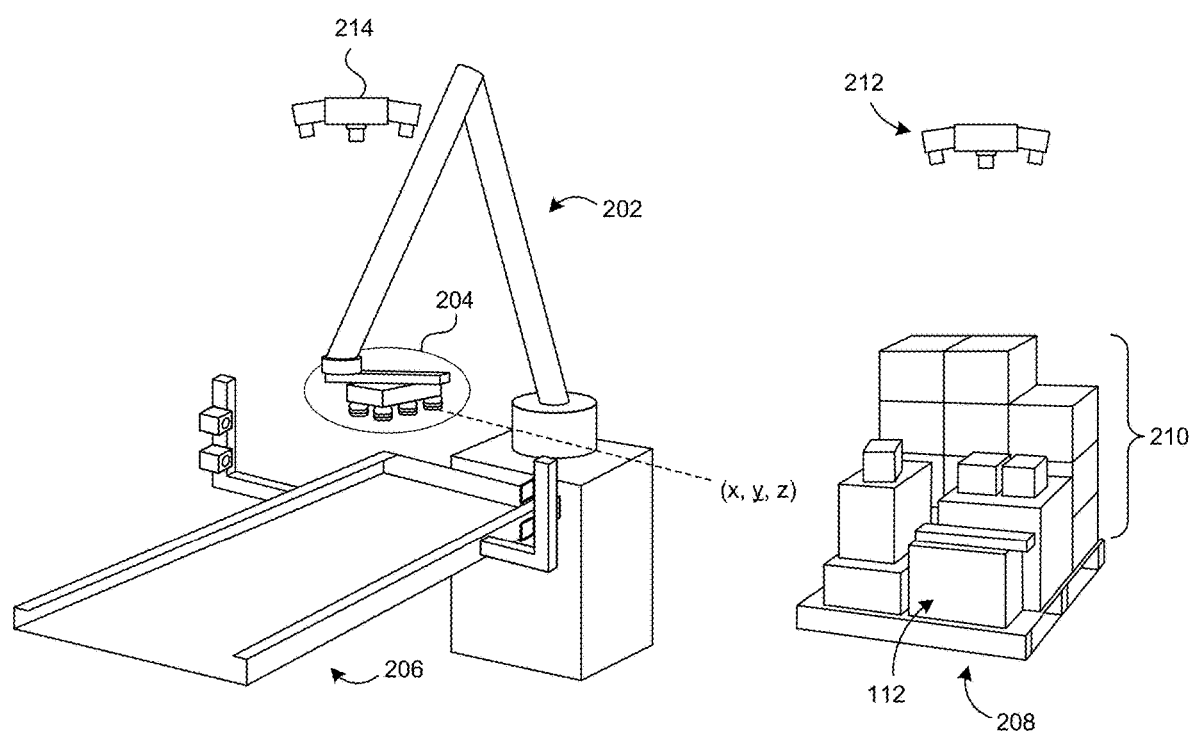
FIG. 2 illustrates the robotic system in accordance with one or more embodiments of the present technology.

FIG. 2 is an illustration of the robotic system 100 of FIG. 1 in accordance with one or more embodiments of the present technology. The robotic system 100 can include a robotic arm 202 (e.g., an instance of the transfer unit 104 of FIG. 1) that includes an end-effector 204 (e.g., a gripper). The robotic arm 202 can be configured to transfer the target object 112 between the start location 114 of FIG. 1 and the task location 116 of FIG. 1. As illustrated in FIG. 2, the start location 114 can have a pallet 208 with a target stack 210 (e.g., a grouping of objects) thereon. The task location 116 for the robotic arm 202 can be a placement location (e.g., a starting/egress point) on a conveyor 206 (e.g., an instance of the transport unit 106 of FIG. 1). For example, the robotic arm 202 can be configured to pick the objects from the target stack 210 and place them on the conveyor 206 for transport to another destination/task.

The robotic system 100 can use one or more sensors in performing the transfer operation with the robotic arm 202. In some embodiments, the robotic system 100 can include a first imaging sensor 212 and/or a second imaging sensor 214. The first imaging sensor 212 can include one or more 2D and/or 3D sensors, such as cameras and/or depth sensors, configured to image and/or analyze the start location 114. The second imaging sensor 214 can include one or more 2D and/or 3D sensors, such as cameras and/or depth sensors, configured to image and/or analyze the task location 116. For example, the first imaging sensor 212 can include one or more cameras and/or depth sensors located at a known location above and facing the start location 114. The first imaging sensor 212 can generate imaging data (e.g., 3D point clouds and/or visual or 2D images) corresponding to one or more top views of the start location 114, such as a top view of the target stack 210. As described in further detail below, the robotic system 100 can use the imaging data from the first imaging sensor 212 to derive a minimum viable region (MVR) for unrecognized (e.g., unregistered) objects in the target stack 210. The robotic system 100 can use the MVR to grip (via, e.g., the end-effector 204) and manipulate (via, e.g., the robotic arm 202) the unrecognized objects, such as in moving the unrecognized objects from the start location 114 to the task location 116. Also, the second imaging sensor 214 can include one or more cameras and/or depth sensors located at one or more known locations above/lateral to and facing the task location 116 or an associated space. Accordingly, the second imaging sensor 214 can generate imaging data corresponding to one or more top and/or side views of the target object 112 at or within a threshold distance from the task location 116.

Object Recognition

Figure 3A:
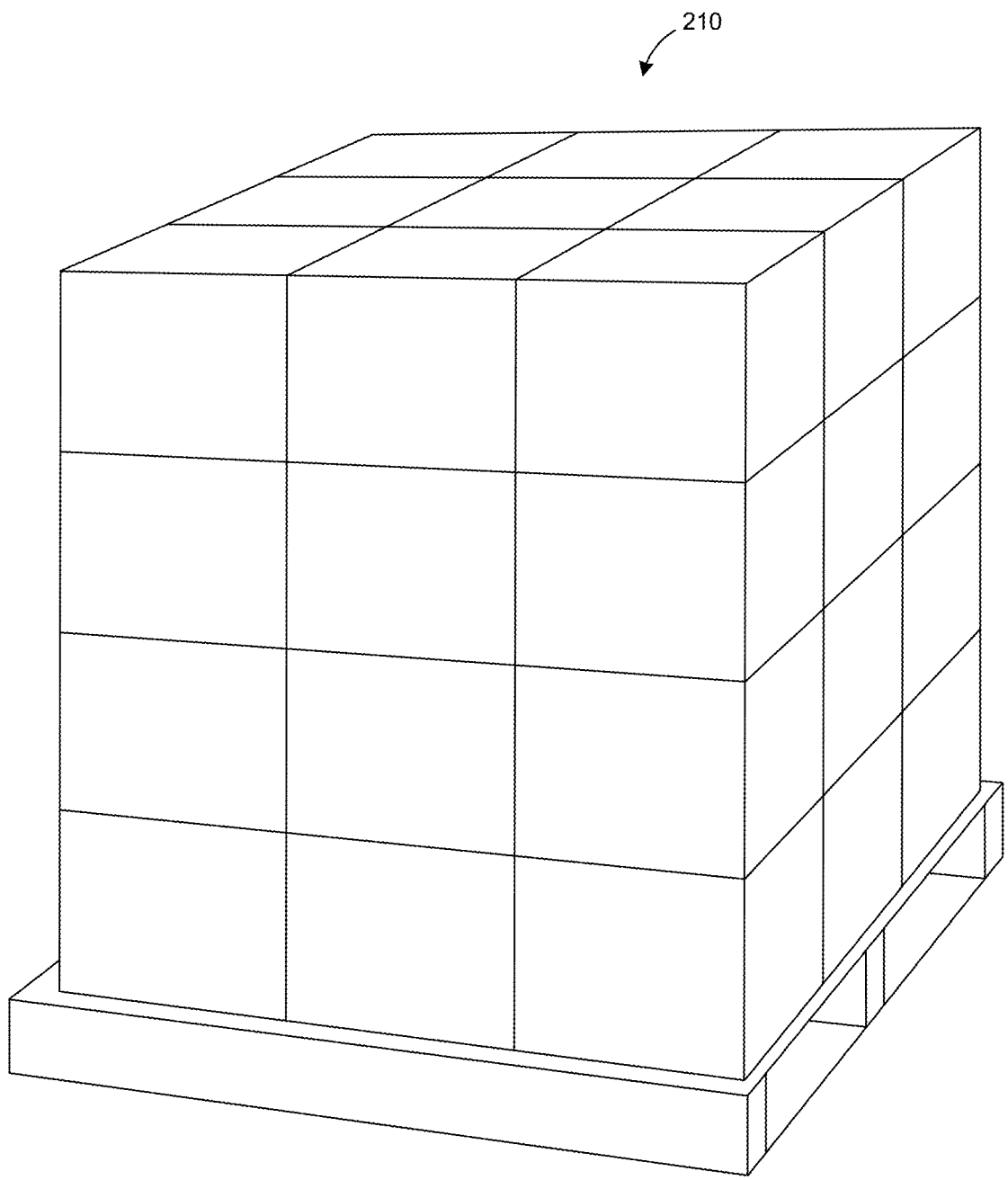
FIG. 3A illustrates an example stack of objects processed by the robotic system in accordance with one or more embodiments of the present technology.
Figure 3B:
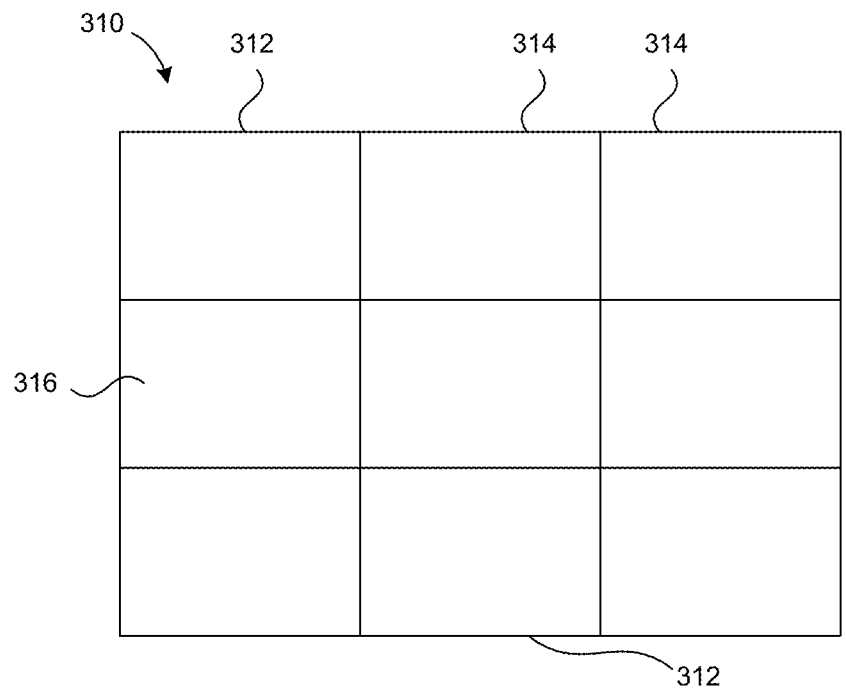
FIG. 3B illustrates a top surface of the example stack in accordance with one or more embodiments of the present technology.
Figure 3C:
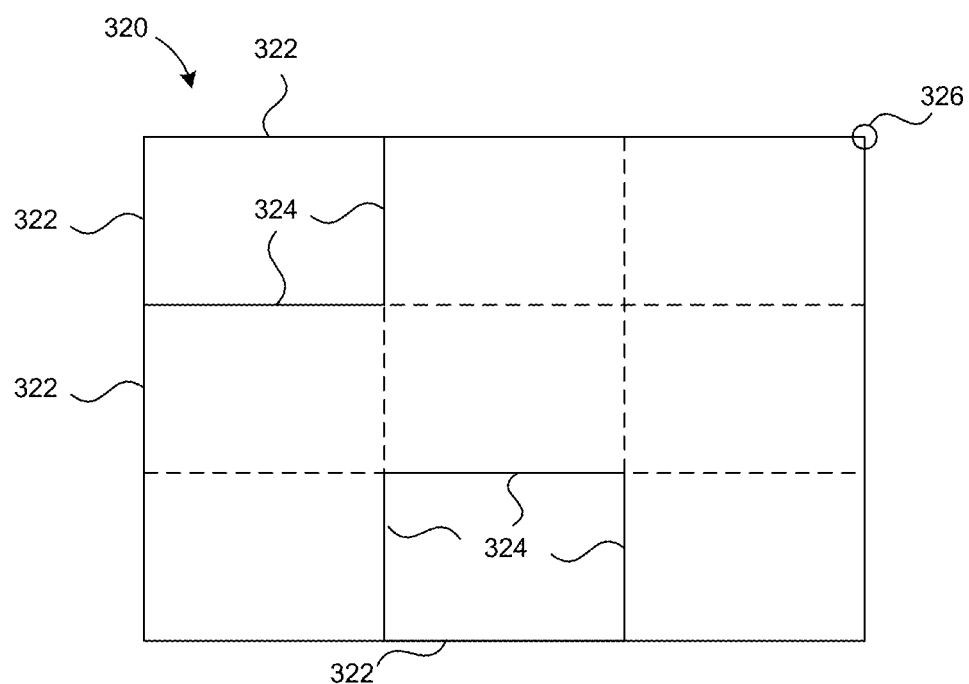
FIG. 3C illustrates sensor data corresponding to the top surface in accordance with one or more embodiments of the present technology.

FIG. 3A is an illustration of an example stack of objects (e.g., the target stack 210 of FIG. 2) processed by the robotic system 100 of FIG. 1; FIG. 3B is an illustration of a top surface of the example stack (e.g., an actual top view 310 of the target stack 210); and FIG. 3C is an illustration of sensor data (e.g., top view data 320) corresponding to the top surface, all in accordance with one or more embodiments of the present technology. Referring to FIGS. 3A, 3B, and 3C together, the robotic system 100 can be configured to transfer the objects within the target stack 210 to another location, such as the task location 116 of FIG. 1 (e.g., the conveyor 206 of FIG. 2), as described above. For transferring the objects, the robotic system 100 can use image data (e.g., the top view data 320) from the first imaging sensor 212 of FIG. 2 that is located above the target stack 210. For example, the top view data 320 can include one or more visual images and/or one or more depth maps that depict or represent the actual top view 310. Further, the robotic system 100 can analyze the top view data 320 to identify edges that may correspond to object boundaries. For example, the robotic system 100 can identify edges and/or continuous surfaces represented in the image data based on differences in depth measurements and/or image traits (e.g., different colors, linear patterns, shadows, differences in clarity, etc.). The robotic system 100 can identify exposed edges 322 (e.g., edges of object top surfaces that are not horizontally abutting another object/surface at substantially the same height), such as based on differences in the depth measurements.

The target stack 210 may include objects registered in master data that includes registration records for expected or previously process objects and/or unexpected objects not registered in the master data. As such, the robotic system 100 can use the image data of object surfaces 316 to recognize or identify the objects that are within the target stack 210. In some embodiments, the robotic system 100 can compare the image data or one or more portions therein to the master data to recognize the objects within the target stack 210. For example, the robotic system 100 can identify the known objects (e.g., recognized objects 312) within the target stack 210 when a portion of the top view data 320 matches one or more images of the object surfaces 316 in registration data. The remaining portions of the actual top view 310 (e.g., portions not matching the registration data) can correspond to unrecognized objects 314. The edges of the unrecognized objects 314 are shown using dashed lines in FIG. 3C.

Based on matching the image data, the robotic system 100 can locate the recognized objects 312 within the corresponding image data, which can be further translated (via, e.g., pre-calibrated table and/or equations that map pixel locations to a coordinate system) to real-world locations for the target stack 210. Further, the robotic system 100 can estimate locations of non-exposed edges of the recognized objects 312 based on the match. For example, the robotic system 100 can obtain dimensions of the recognized objects 312 from the master data. The robotic system 100 can measure portions of the image data that is separated by the known dimensions from the exposed edges 322 of the recognized objects 312. According to the mapping, the robotic system 100 can determine one or more registration-based edges 324 for the recognized objects 312 and/or similarly map the registration-based edges 324 to real-world locations similarly as described above.

In some embodiments, the robotic system 100 can identify exposed outer corners 326 of the target stack 210 as represented in the image data (e.g., the point cloud data). For example, the robotic system 100 can identify the exposed outer corners 326 based on detecting intersections/junctions between two or more of the exposed edges 322 (e.g., edges identified in 3D image data, also referred to as 3D edges) having different orientations (e.g., extending at different angles). In one or more embodiments, the robotic system 100 can identify the exposed outer corners 326 when the exposed edges 322 form an angle that is within a predetermined range (also referred to as an angle range), such as for a threshold angle range greater than and/or less than 90°. As described in detail below, the robotic system 100 can use the exposed outer corners 326 and the corresponding exposed edges 322 to process and/or manipulate the unrecognized objects 314.

Processing of Unrecognized Objects

Figure 4A:
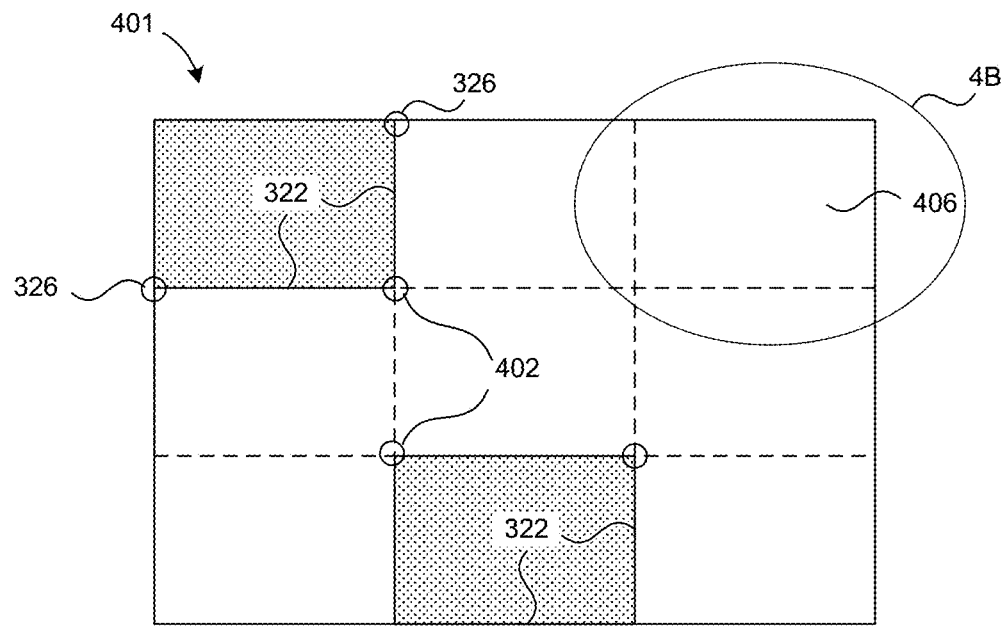
FIG. 4A illustrates sensor data corresponding to a top surface following an initial set of operations in accordance with one or more embodiments of the present technology.

In some embodiments, the robotic system 100 of FIG. 1 can process (e.g., identify and/or transfer) the objects according to recognition status and/or relative locations of the objects within the target stack 210 of FIG. 2. For example, the robotic system 100 can pick and transfer the recognized objects first, and then generate another set of image data from the sensors (e.g., the first imaging sensor 212 of FIG. 2). FIG. 4A is an illustration of sensor data 401 corresponding to a top surface following an initial set of operations (e.g., picking and transferring the recognized objects 312) in accordance with one or more embodiments of the present technology. The shaded areas in FIG. 4A correspond to changes in depth measurements following the removal of the recognized objects 312 shown in FIGS. 3B and 3C.

When the robotic system 100 does not identify any of the recognized objects 312 in the image data (e.g., the 2D image and/or the 3D point cloud), the robotic system 100 can process the image data to identify any exposed corners 326 and/or the exposed edges 322 for locating the unrecognized objects 314 of FIG. 3A. For example, the robotic system 100 can process the sensor data 401 (e.g., the 3D point cloud) similarly as described above to identify the exposed outer corners 326 and/or the exposed edges 322. Accordingly, the robotic system 100 can additionally identify and/or locate any corners/edges that are exposed after removing the recognized objects 312. In some embodiments, the robotic system 100 can further identify exposed inner corners 402 as intersections/junctions between two or more of the exposed edges 322 according to a corresponding threshold angle range. For example, the robotic system 100 can identify the exposed inner corners 402 as junctions between two or more of the exposed edges 322 that exceed 180° relative to the corresponding continuous surfaces. In some embodiments, the robotic system 100 can identify the exposed inner corners 402 when the exposed edges 322 form an angle that is within a threshold angle range greater than and/or less than 270°.

In some embodiments, when none of the recognized objects 312 are remaining, the robotic system 100 can identify registration targets 406 in the target stack 210 (e.g., from amongst the unrecognized objects 314) based on the exposed corners and/or the exposed edges. For example, the robotic system 100 can evaluate the exposed corners/edges according to a set of preferences and/or scoring mechanism. In some embodiments, the robotic system 100 can be configured to select the exposed outer corners 326 nearest to the robotic arm 202 of FIG. 2. The robotic system 100 can select the corresponding region of the sensor data 401 and the corresponding unrecognized object 314 associated with the selected exposed outer corners 326. In other words, after processing the recognized objects 312, the robotic system 100 can process the unrecognized objects 314 that form/constitute the exposed outer corners 326 of the target stack 210. Based on analyzing the corresponding portions of the sensor data 401 (via, e.g., deriving the MVR), the robotic system 100 can grip the unrecognized objects 314, lift and/or horizontally transfer the gripped object, and/or image the gripped object for registration purposes. Additionally, after imaging the gripped object, the robotic system 100 can transfer the gripped object to a destination (e.g., the conveyor 206 of FIG. 2).

Figure 4B:
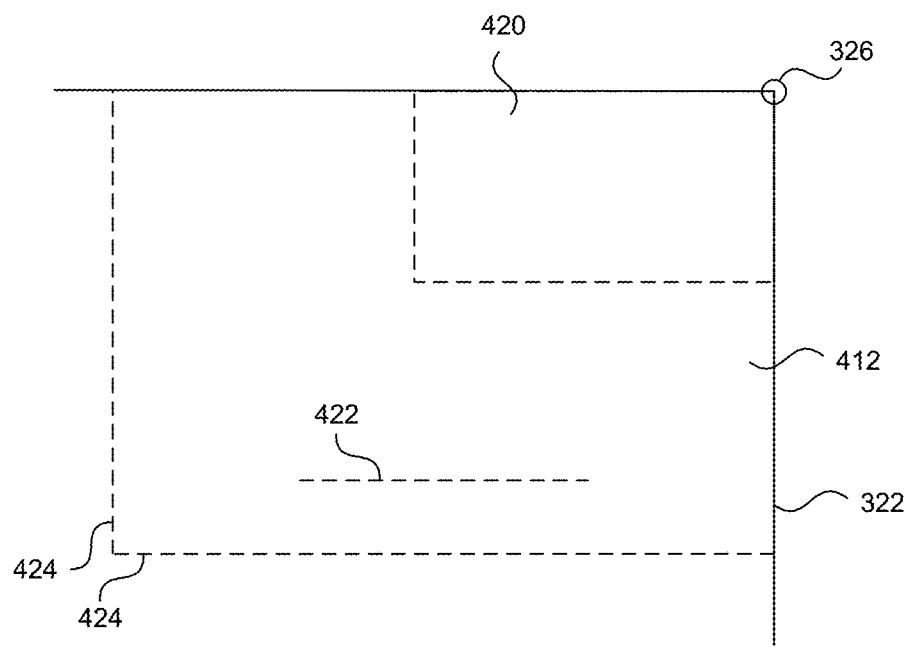
FIG. 4B illustrates a portion of the sensor data illustrated in FIG. 4A in accordance with one or more embodiments of the present technology.

For further describing the sensor data analysis, FIG. 4B is a detailed illustration of a portion 4B of the sensor data 401 of FIG. 4A in accordance with one or more embodiments of the present technology. The robotic system 100 can analyze the sensor data 401 to derive an MVR 412 that can be used to determine a grip location 420. The MVR 412 can represent a minimum-sized area used to contact, grip, and/or lift objects. Accordingly, in some embodiments, the MVR 412 can be based on the end-effector 204 of FIG. 2. For example, the MVR 412 can be associated with a footprint of the end-effector 204, such as an area along the x-y plane occupied by the end-effector 204 (e.g., the suction cups of the gripper), or a larger area with additional/buffer regions surrounding the footprint. Also, for example, the MVR 412 can be associated with estimated locations of horizontal boundaries/edges of an unrecognized object (e.g., the selected registration target). In some embodiments, the MVR 412 can correspond to a minimum and/or a maximum candidate size, which can correspond to physical dimensions (e.g., lengths, widths, heights, diameters, circumferences, etc.) for the smallest or largest possible instance of the objects in the target stack 210, respectively. In other words, the robotic system 100 can determine that none of the objects within the target stack 210 will have dimensions that are less than the minimum candidate size or greater than the maximum candidate size. The minimum and maximum candidate sizes can be predetermined values (i.e. values provided or known in advance of processing the target stack 210). Details regarding the derivation of the MVR 412 are described below.

In some embodiments, the robotic system 100 can derive a set of potential grip locations using the MVR 412. For example, the robotic system 100 can derive a first grip location with a dimension of the MVR 412 aligned to a first exposed edge and a second grip location with the dimension aligned to a second exposed edge. In some embodiments, the robotic system 100 can derive more than one grip location with the MVR 412 aligned to one of the exposed edges. Also, the robotic system 100 can derive the first grip location within the MVR 412 or overlapping a portion of the MVR 412.

The robotic system 100 can use the MVR 412 to determine a grip location 420. The grip location 420 can correspond to an area on the object/stack that will be directly under and/or contact the end-effector 204 for the initial manipulation. In other words, the robotic system 100 can place the gripper over the grip location 420 to grip the corresponding object for subsequent manipulations (e.g., lift, horizontal transfer, and/or data collection processes for registration). In some embodiments the robotic system 100 can select the grip location 420 from the set of potential grip locations. For example, the robotic system 100 can select from the set according to a relative orientation of the arm (e.g., with preference for the robotic arm extending across the exposed edges 322 and not overlapping other portions).

In some embodiments, the robotic system 100 can derive the grip location 420 and/or the MVR 412 based on detected lines 422 and/or estimated edges 424. For example, the robotic system 100 can identify the detected lines 422 and/or the estimated edges 424 based on differences in depth measurements and/or image traits in the sensor data 401. The robotic system 100 can identify edges/lines that do not intersect the exposed edge 322 as the detected lines 422, which may correspond to lines within surface markings of the object or object edges. The robotic system 100 can identify results that intersect with at least one exposed edge 322 as the estimated edges 424. The robotic system 100 may also identify/verify the estimated edges 424 based on comparing orientation of the identified edges/lines to the orientation of the exposed edges 322. For example, the robotic system 100 can verify an identified edge/line as the estimated edge 424 when it is parallel with one of the exposed edges 322. In some embodiments, the robotic system 100 can test for the parallel orientations based on verifying equal distances between two or more corresponding points on the tested pair of edges (e.g., the identified edge and the one of the exposed edges 322). In some embodiments, the robotic system 100 can identify the parallel orientations when the tested pair of edges intersect a common edge at same angles, such as when both edges intersect another exposed edge at angle between 80°-100°.

Accordingly, the robotic system 100 can derive the grip location 420 that does not overlap the detected lines 422 and/or the estimated edges 424. The robotic system 100 can derive the grip location 420 based on balancing a ratio between distances between edges of the MVR 412 and the nearest detected lines 422 and/or the estimated edges 424. Since the robotic system 100 will be gripping the object at or about a corner based on the MVR 412, the robotic system 100 can derive the grip location 420 that will reduce maximum potential torque along any one particular direction based on balancing the ratio. Also, the robotic system 100 may further derive or adjust the MVR 412 to coincide with or extend out to the estimated edges 424 and/or the detected lines 422.

The robotic system 100 can use the derived grip location 420 to maneuver the robotic arm 202 of FIG. 2 and the end-effector 204. The robotic system 100 can grip the object (e.g., the registration target 406) located at the corner of the stack at the grip location 420. In some embodiments, the robotic system 100 can lift and/or horizontally transfer the gripped object for clearly distinguishing the previously non-exposed edges. For example, the robotic system 100 can lift and/or horizontally transfer the object by a predetermined height that corresponds to a minimum distance for accurately distinguishing edges. Also, for example, the robotic system 100 can lift and/or horizontally transfer the object while monitoring and/or analyzing the height changes and/or a tilt in the end-effector, such that additional edges opposite to the exposed edges 322 become recognizable. The robotic system 100 can obtain and process data during and/or after the initial lift to further describe the unrecognized objects 314.

MVR Detection Overview

The present embodiments may relate to generating accurate Minimum Viable Regions (MVRs) of an object. An exposed outer corner and exposed edges may be identified by inspecting 2D and/or 3D imaging data (e.g., point cloud data). Based on the identified exposed outer corner and exposed edges, an initial MVR may be generated by identifying edges that oppose the exposed edges. In some embodiments, the robotic system 100 can generate the MVR based on identifying opposing edges (e.g., the estimated edges 424 of FIG. 4B) that correspond to (e.g., parallel to) exposed edges. The initial MVR may extend from the exposed outer corner along the exposed edges to the opposing edges.

After the initial MVR is determined, potential MVR regions expanding from the initial MVR to an end of a surface or layer (e.g., a set of laterally adjacent locations having depth measures within a threshold continuity range of each other) defined by the point cloud may be identified. A merged MVR of the object may include the initial MVR and the potential MVRs. A verified MVR may be generated by inspecting/testing the merged MVR. The verified MVR may represent an accurate region that encompasses the unrecognized object. Based on the verified MVR, the robotic system 100 as described herein may register the object and perform a task with respect to the object, such as grip and/or move the object.

In many cases, an edge (e.g., an outer or exposed edge) of the object may be identified. For example, outer edges of objects located along the periphery of the target stack 210 of FIG. 2 (e.g., the exposed edges 322 of FIG. 3C) can be absent of and/or separated from any surrounding objects. Accordingly, the imaging result (e.g., the 3D point cloud) can include abrupt changes in depicted values (e.g., height measurements and/or image values, such as colors or brightness) representative of the outer edges. However, in many cases, other edges may not be visible or may be difficult to accurately define (e.g., based on a threshold confidence value). For example, surface designs/images on a box may lead to incorrect edges identified on the object. Accordingly, it may be difficult to accurately separate portions in the 2D/3D imaging data due to incomplete edges.

The robotic system 100 may identify the exposed outer corners 326 and/or exposed edges 322 of an object by inspecting the image data (e.g., a point cloud and/or a 2D image) and determining one or more layers. For example, the robotic system 100 can identify a top layer of object(s) (e.g., the unrecognized objects 314 of FIG. 3B) in the target stack 210 based on the imaging result. Within the top layer, the robotic system 100 can select an object and/or a portion of a surface (e.g., a region having height values within a threshold continuity range of each other) for MVR derivation. The robotic system 100 can estimate that the exposed edges forming/defining the surface (e.g., one of the layers or a portion therein) correspond to lateral/peripheral boundaries of the surface and/or the corresponding object. An initial MVR may be generated by identifying opposing edges that oppose the exposed edges, wherein the initial MVR may extend from the exposed outer corner (e.g., an intersection formed by a set of the exposed edges and/or the peripheral boundaries) along the exposed edges to opposing edges.

The robotic system 100 can further process (e.g., adjust) the initial MVR by expanding and/or shrinking the initial estimate based on markers (e.g., incomplete edges) in the imaging data. The adjusted MVR can be inspected to determine a final MVR used to determine the grip location 420 and/or register the unrecognized object.

Figure 5:
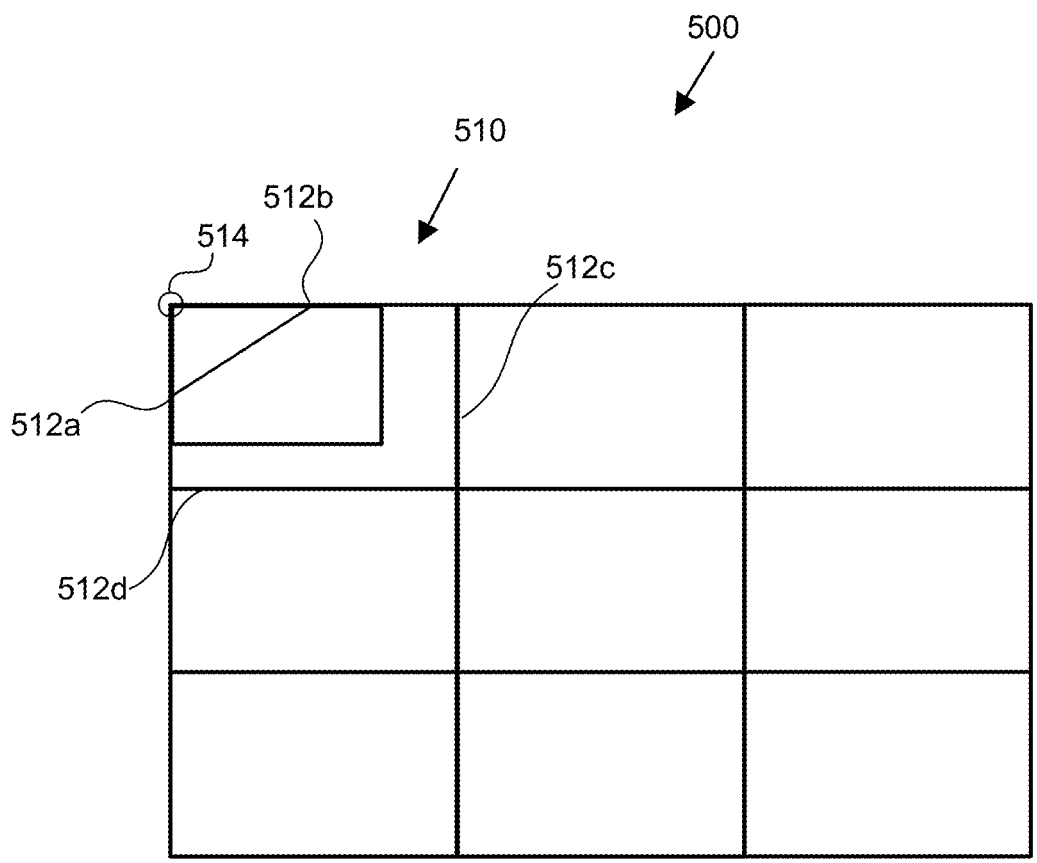
FIG. 5 illustrates a top view of a set of palletized packages in accordance with some embodiments of the present technology.

FIG. 5 illustrates a top view of a set of palletized packages 500 (e.g., the target stack 210 of FIG. 2) in accordance with some embodiments of the present technology. As shown in FIG. 5, a first object 510 can include edges 512a-d. An edge can represent a boundary of the object as viewed from a given view (e.g., a top view). Under certain situations, at least a portion of the edges 512a-d (e.g., edges 512c-d) may be closed and abut other adjacent objects/edges. Conversely, some of the edges (e.g., the edges 512a-b) may be open and correspond to the exposed edges 322 of FIG. 3C.

The first box 510 can include one or more exposed outer corners 514 that are separated from or without any horizontally adjacent objects. The exposed outer corners 514 may correspond to the exposed outer corners 326 of FIG. 3 of the stack. As discussed below, the image data (e.g., a point cloud and/or a 2D image) may be inspected to identify exposed edges and an exposed outer corner of a package.

Point Cloud Segmentation

Figure 6:
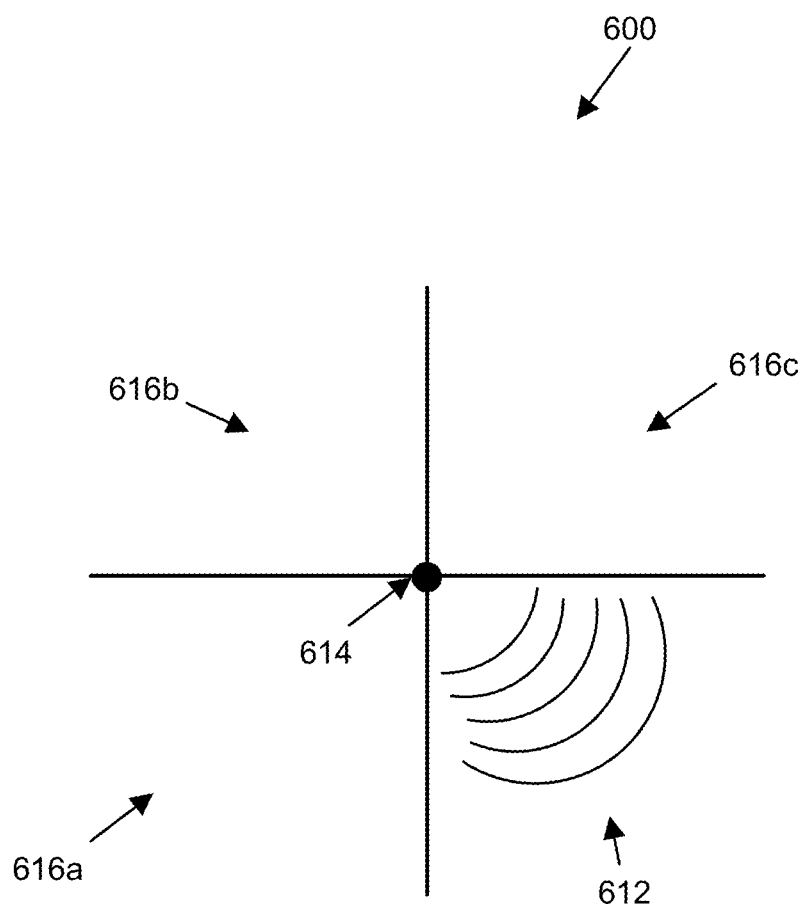
FIG. 6 illustrates a graphical representation of an exposed outer corner in accordance with some embodiments of the present technology.

FIG. 6 illustrates a graphical representation 600 of an exposed outer corner in accordance with some embodiments of the present technology. As shown in FIG. 6, a point cloud (e.g., the graphical representation 600) may be processed to identify an exposed outer corner 614 (e.g., one of the exposed outer corners 326 of FIG. 3). For example, the point cloud can correspond to a top-view generated by a 3D camera of the first object 510 of FIG. 5 or a portion thereof. The point cloud may include a 3-dimensional point cloud with multiple layers indicative of depth. Each layer and/or a surface may correspond to a set of horizontally adjacent depth values that are within a threshold continuity range from each other. For example, the threshold continuity range can require horizontally adjacent locations to have depth measures that are within a threshold distance (e.g., less than 1 centimeter) from each other or within a threshold distance according to a slope. Also, the threshold continuity range can define a floor and/or a slope relative to a reference height (e.g., a highest/closest point in the target stack 310). The threshold continuity range can similarity define limits for 2D image characteristics (e.g., color and/or brightness) for identifying continuity across a set of horizontally adjacent locations. A depth of a layer of the point cloud may correspond to a separation along a direction normal to a surface of a corresponding object (e.g., vertical separation).

Accordingly, the point cloud may be analyzed and processed to separate the layers and/or to identify open 3D edges/corners. In some embodiments, the robotic system 100 (e.g., one or more processors therein) can identify layers based on grouping depth values in the point cloud according to one or more predetermined continuity rules/threshold. For example, the robotic system 100 can group a set of horizontally adjacent/connected depth values when the depth values are within the threshold continuity range of each other and/or when the depth values follow a constant slope representative of a flat and continuous surface. The robotic system 100 can identify exposed edges (e.g., exposed edges 512a and 512b of FIG. 5) as boundaries of the identified layers. In other words, the robotic system 100 can identify the exposed edges 512a and 512b as horizontal peripheral locations of the layer/surface where a qualifying depth change occurs. In general, the depth measures for objects/edges forming a top layer of the target stack 210 may have a lower magnitude (e.g., representative of closer distance to the first image device 312) than objects/edges forming a lower layer below the top layer.

In some embodiments, the robotic system 100 can determine the exposed edges based on identifying visual lines in 2D visual images. For example, pallets and/or floors may correspond to a known color, brightness, etc. Accordingly, the robotic system 100 can identify lines that border such known patterns as exposed edges of the object(s). Also, the robotic system 100 can use the 2D analysis to verify the 3D identification of the exposed edges.

Based on the exposed edges, the robotic system 100 can identify open 3D corners (e.g., exposed outer corner 514). For example, the robotic system 100 can identify shapes/angles associated with the exposed edges. The robotic system 100 can be configured to determine the exposed outer corner 514 as location in the point cloud where the exposed edges (e.g., edges 512a-b) intersect at/form an angle within a threshold angle range (e.g., 80°-100°).

As an illustrative example, the robotic system 100 can identify the open 3D corner 614 by identifying a first region 612 and adjacent regions 616a-c. The robotic system 100 can identify the first region 612 when a set of adjacent horizontal locations in the scanned region layer having depth values that are within the threshold continuity range from each other. The robotic system 100 can identify the adjacent regions 616a-c as other horizontal locations having depth values that are outside of the threshold continuity range from depth values in the first region 612. In some embodiments, the robotic system 100 can identify edges of the first region 612 and/or start of the adjacent regions 616a-c when depth values change to fall outside of the threshold continuity range and/or when the locations of the depth value changes match a shape template (e.g., a straight line and/or a minimum separation width between objects). More specifically, the adjacent regions 616a-c can have the depth values that represent distances that are further from the first image imaging sensor 212 than the depth values for the surface of the target stack 210 (i.e. the first region 612). The resulting edges between the first region 612 and the adjacent regions 616a and 616c can correspond to the exposed edges. In some embodiments, identifying the open 3D corner 614 may include verifying that the first region 612 forms a quadrant, while the adjacent regions 616a-c correspond to remaining quadrants and/or empty spaces, such as for locations outside of the object stack. An empty space may indicate a space detected with very sparse point cloud which may be considered as point cloud noise.

Other 3D corners may be determined using the 3D point cloud. In some embodiments, the exposed outer corner may be a contour shape, and an shaped corner may not comprise a valid corner. Accordingly, the robotic system 100 may identify edge segments that meet one or requirements (e.g., a minimum straight continuous length) and based on extending such edge segments by a predetermined length. When the extended edge segments intersect other segments or extended segments at an angle, the robotic system 100 can identify a point on the contour shape (e.g., a mid-point of the arc located between the intersecting edge segments) as the exposed outer corner.

In some embodiments, the 3D corners may be ranked. For example, 3D corners surrounded by empty space (e.g., for objects located at the corner of a top layer in the stack) may be ranked higher than other objects. The open 3D corner 614 can be ranked based on other factors, such as a size of the first region 612, the location of the open 3D corner 614 relative to a shape of the first region 612, a difference in depth values between surrounding regions (e.g., between the first region 612 and the adjacent regions 616a and 616c), and/or a horizontal distance between the first region 612 and another region (e.g., another surface/object) having depth values within the threshold continuity range from those in the first region 616a.

In some embodiments, the robotic system 100 may identify an incomplete edge. The incomplete edges may be edges identified in 2D and/or 3D analysis that may or may not be actual edges. Some of the incomplete edges can correspond to actual edges of boxes/gaps between boxes that may not be identifiable because of the noise, placement of other objects, and/or the capacity/position of an imaging device (e.g., camera). The incomplete edges may also be visual patterns or markings on the object surfaces detected from 2D image analysis, such as surface drawings or markings, or a division/seam between box flaps that are taped together. Conversely, boxes with no patterns may not have any 2D lines that can be identified as the incomplete edges. The robotic system 100 can identify the incomplete edges at locations in the sensor outputs that exceed noise variances but fail to completely satisfy rules/thresholds for edge identification. In some embodiments, the robotic system 100 can identify the exposed outer edges (e.g., peripheral edges of the first region 612) using the 3D sensor outputs and identify the incomplete edges using the 2D sensor outputs. Also, the robotic system 100 may identify the incomplete edges as 2D or 3D edges that do not intersect with other edges at an angle that does fall within the angle threshold range. Details regarding the incomplete edges are described in detail below.

Generating an Initial MVR

Figure 7:
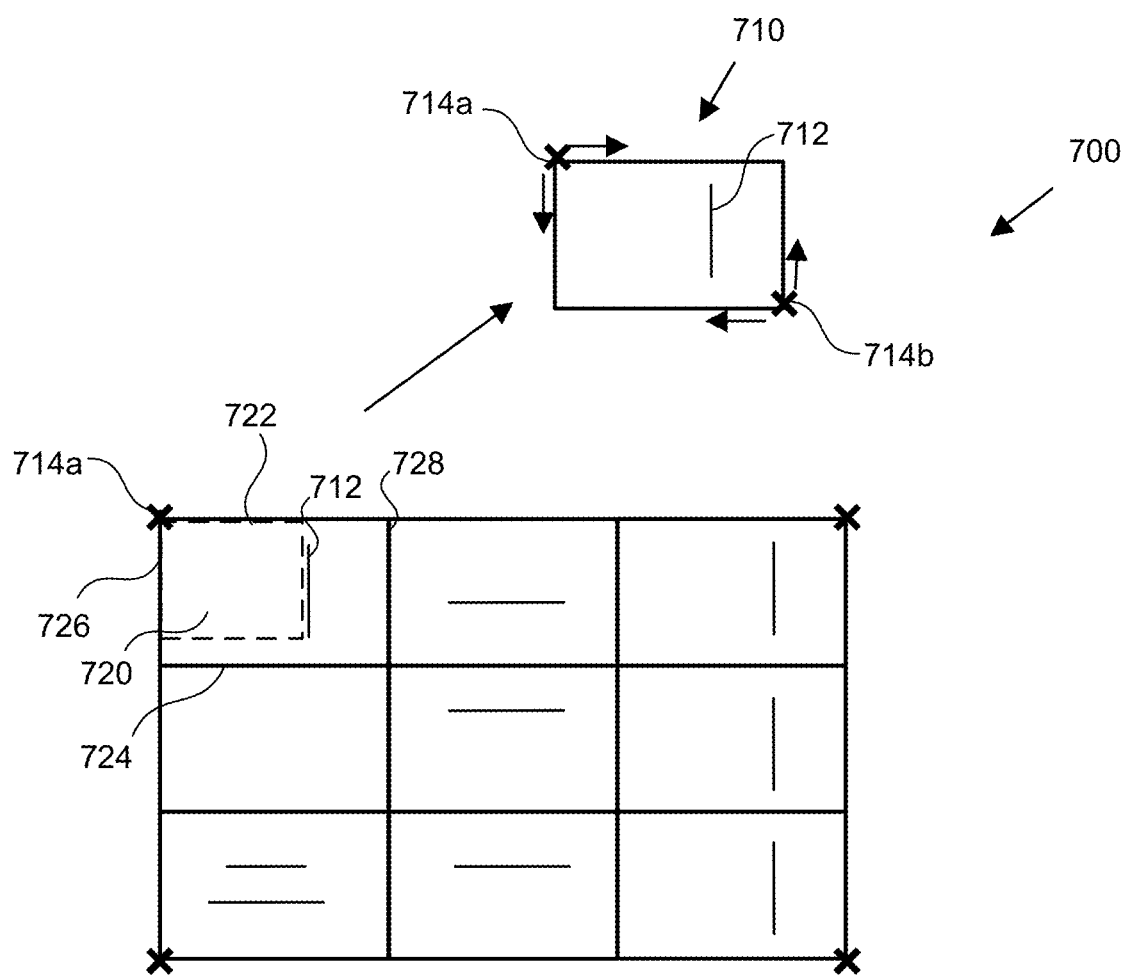
FIG. 7 illustrates a top view of a set of palletized packages in accordance with some embodiments of the present technology.

FIG. 7 illustrates a top view of a set of palletized packages in accordance with some embodiments of the present technology. FIG. 7 further illustrates an initial MVR 710 in relation to the top view (e.g., 3D and/or 2D sensor image of the target stack 210 of FIG. 2). The initial MVR 710 may represent an initial estimate of the bounds of an MVR and/or edges of a corresponding object. In other words, the initial MVR 710 can represent an initial estimate of a surface for one unrecognized object. The robotic system 100 can use the open 3D corner and/or exposed edges to derive the initial MVR 710. Deriving the initial MVR 710 may include inspecting each of the layers identified from the point cloud to identify objects, edges, corners, etc. For example, the robotic system 100 can derive the initial MVR 710 as a region in the point cloud data (e.g., 3D sensor output) having depth values within the threshold continuity range from each other (e.g., the first region 612 of FIG. 6). In other words, the robotic system 100 can derive the initial MVR as the grouping of horizontally adjacent locations having sufficiently identical or linearly patterned depth values corresponding to a continuous surface. Accordingly, the robotic system 100 can derive the initial MVR as an area that is at least partially bounded by the exposed outer corners 514 (e.g., a first corner 714a and/or a second corner 714b) and corresponding exposed edges. For example, the initial MVR 710 can extend from first corner 714a along exposed edges 722 and 726 to opposing edges 724 and 728. In some embodiments, the robotic system 100 may derive the initial MVR 710 by starting at an open 3D corner (e.g., the first corner 714a) and following exposed edges (e.g., away from the first corner 714a). The initial MVR 710 may be extended until the followed exposed edges are intersected or faced by other exposed edges (e.g., edges opposite and/or parallel to the non-followed edge, such as the opposing edges 724 and/or 728).

In some instances, the initial MVR 710 may correspond to surfaces of multiple objects due to various reasons (e.g., spacing between objects, sensor granularity, etc.). Accordingly, the robotic system 100 may verify one or more dimensions of the derived initial MVR 710. The robotic system 100 can verify that the one or more dimensions of the MVR 710 are larger than a minimum candidate size and smaller than a maximum candidate size. The threshold dimension may represent a smallest and/or a largest dimension for objects receivable/expected for the robotic system 100. Also, the threshold dimension may represent a horizontal footprint of the end-effector 204 of FIG. 2, such as for representing a minimum size for the gripping/contact area.

When one or more dimensions of the initial MVR 710 fall outside of the thresholds (by, e.g., exceeding the maximum dimension or falling below the minimum dimension), the robotic system 100 can adjust the initial MVR 710, such as by conducting a further segmentation of the initial MVR 710 (e.g., a top most layer) according to incomplete edges 712 (e.g., the detected lines 422 and/or other 2D/3D edges that do not match or intersect another edge at one or more ends). In other words, the robotic system 100 can adjust/reduce the initial MVR according to the incomplete edges 712 and test a corresponding result. In some embodiments, the robotic system 100 can determine the incomplete edge 712 as 2D edges and/or 3D edges that do not intersect with an exposed edge on one or more ends. Also, the robotic system 100 can determine the incomplete edge 712 as 2D and/or 3D edges that are parallel to one of the exposed edges. In some embodiments, the robotic system 100 can calculate confidence values associate with the incomplete edges 712. The confidence values can represent a likelihood that the incomplete edges 712 correspond to surface edges and/or separations between adjacent objects. As an example, the robotic system 100 can calculate the confidence values based on a total length of the incomplete edges 712, a shape of the incomplete edges 712, and/or a difference between the incomplete edges 712 and portions surrounding the incomplete edges 712 (e.g., for depth, color, brightness, etc.).

As described in detail below, the robotic system 100 may derive a verified MVR 720 based on decreasing the initial MVR 710 according to or down to the incomplete edges 712. In other words, the robotic system 100 can identify a reduced candidate MVR as an area within the initial MVR 710 that is bounded by one or more of the incomplete edges 712 instead of opposite parallel edges 724 and/or 728. The robotic system 100 can decrease the initial MVR 710 by following an opposite parallel edge (e.g., opposite parallel edges 724, 728, which may be 2D and/or 3D edges such as the estimated edges 424 of FIG. 4B) towards a corresponding exposed edge (e.g., corresponding exposed edges 722, 726, respectively) until the incomplete edge 712 is reached. In other words, the robotic system 100 can identify the second corner 714b associated with the initial MVR 710, and then move away from the second corner 714 along associated edges (e.g., the opposite parallel edges 724 and/or 728) while searching for other edges (e.g., intersecting and/or parallel edges, such as the incomplete edges 712). The robotic system 100 can test an orientation of the identified edges as described above. For example, the robotic system 100 may verify the identified edges when an angle between the traversed edge and the identified edge is within a threshold angle range (e.g., 80° to 100° and/or other ranges that correspond to a right angle). Also, the robotic system 100 may verify the identified edges are parallel to corresponding exposed edges, such as when a set of distances between multiple sets of corresponding points along the identified and the non-traversed exposed edge are within a threshold range from each other. This may be performed iteratively or incrementally. If the MVR cannot be reduced any further, the robotic system 100 may conclude the resulting area as the verified MVR region 720.

The robotic system 100 can verify the reduced candidate MVR based on comparing the decreased dimension to the thresholds as described above. For example, the robotic system 100 can derive the reduced candidate MVR as the verified MVR 720 when the decreased area defined by the incomplete edge 712 satisfies the min/max thresholds. Also, the robotic system 100 can verify the reduced candidate MVR when the incomplete edges 712 correspond to confidence values exceeding a predetermined threshold. Further, the robotic system 100 can extend the incomplete edges 712 by a threshold distance in one or more direction. For example, the robotic system 100 may verify the reduced candidate MVR when the extended incomplete edges intersect other edges to form an angle that satisfies a threshold angle range.

Figure 8:
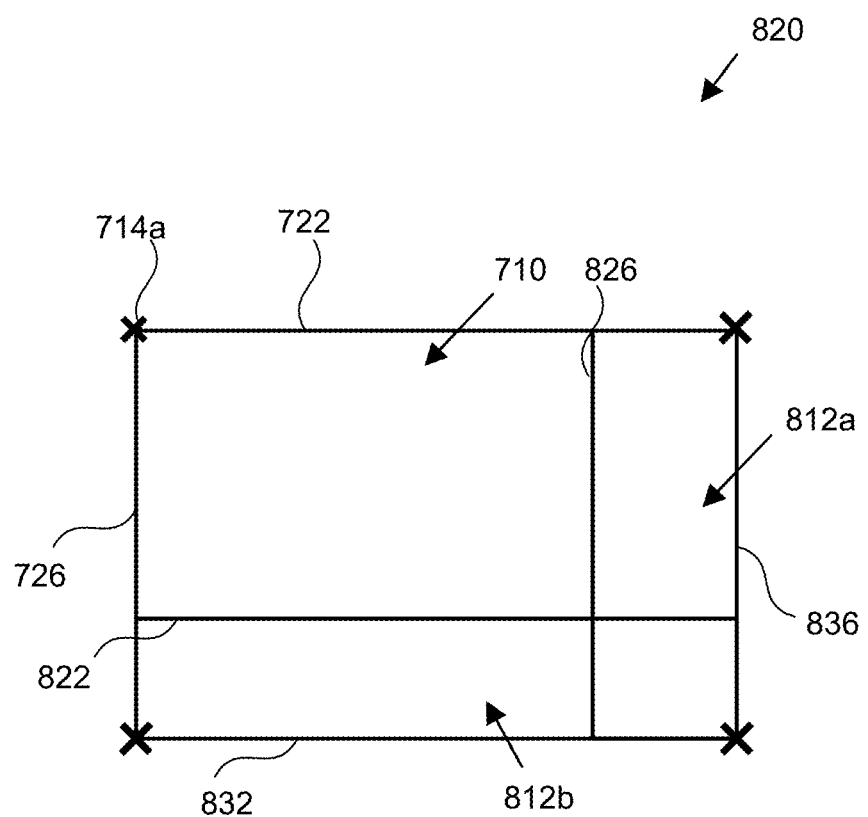
FIG. 8 illustrates an example of a merged MVR region in accordance with some embodiments of the present technology.

As an example of enlarging the initial MVR 710, FIG. 8 illustrates an example of a merged MVR region in accordance with some embodiments of the present technology. In some instances, multiple adjacent surfaces may have essentially the same height and have an edge/horizontal separation between the surfaces. As an illustrative example, the object represented in the point cloud may be a top surface of a box that has two separated rectangular flaps/segments connected by a strip of tape. Due to one or more limitations discussed above, the robotic system 100 may derive the initial MVR 710 to include one flap and extend up to the edge corresponding to the tape or the separation between the flaps/segments. For such instances, the robotic system 100 can derive additional regions and merge/test them with the initial MVR 710 in deriving a verified MVR 820.

As shown in FIG. 8, additional plausible MVR regions 812a-b may be determined based on the initial MVR 710. The additional plausible MVR regions 812a-b may include regions that are correlated to the initial MVR 710. For example, the robotic system 100 can determine the additional plausible MVR regions 812a-b based on analyzing portions of the 2D and/or the 3D images. The robotic system 100 can determine the additional plausible MVR regions 812a-b as locations having a matching visual characteristic (e.g., color, brightness, and/or image pattern) and/or matching depth values that are within the threshold continuity range relative to the initial MVR 710. The robotic system 100 can derive candidate areas as portions of the images determined as being associated with the initial MVR 710.

As an illustrative example, the robotic system 100 can process the MVRs (e.g., initial and expanded MVRs) based on following the first and second exposed edges 722 and 726 (e.g., edges depicted in the 3D image data) away from the exposed outer corner 714a. The robotic system 100 can identify an initial set of opposing edges that include a first initial opposing edge 822 and the second initial opposing edge 826. The robotic system 100 can verify the initial set of opposing edges when the first exposed edge 722 is parallel to the first initial opposing edge 822 and/or the second exposed edge 726 is parallel to the second opposing edge 826. The robotic system 100 can use the verified opposing edges to derive the initial MVR 710.

The robotic system 100 can further determine the additional plausible MVR regions 812a-b based on following the first and second exposed edges 722 and 726 beyond the initial set of opposing edges (e.g., away from the exposed outer corner 714a). The robotic system 100 can identify one or more further opposing edges (e.g., a first edge 832 and/or a second edge 836) that intersect or within a threshold separation distance from the followed edge (e.g., the first exposed edge 722 and/or the second exposed edges 726). The robotic system 100 can verify the further opposing edges similarly as described above, such as when the first edge 832 is parallel to the first exposed edge 722 and/or the first initial opposing edge 822 and/or when the second edge 836 is parallel to the second exposed edge 726 and/or the second initial opposing edge 826.

When the one or more further opposing edges are verified, the robotic system 100 can identify the additional plausible MVR regions. For example, the robotic system 100 can identify a first additional plausible MVR region 812a as an area between the first initial opposing edge 822 and a first of the further opposing edge (e.g., the first edge 832). Also, the robotic system 100 can identify a second additional plausible MVR regions 812b as an area between the second initial opposing edge 826 and a second of the further opposing edge (e.g., the second edge 836).

The robotic system 100 can determine the additional plausible MVR regions 812a-b based on verifying/testing the candidate areas (e.g., combinations of the initial MVR 710 and the first additional plausible MVR region 812a and/or the second additional plausible MVR region 812b). For example, the robotic system 100 can verify that separation distances between candidate areas (e.g., portions of the images determined as being associated with the initial MVR 710) and the initial MVR 710 are less than a predetermined threshold. The robotic system 100 can further test the candidate areas by comparing one or more dimensions thereof to minimum/maximum dimension thresholds described above. The robotic system 100 may determine the candidate areas as the additional plausible MVR regions 812a-b when the candidate areas are below a minimum threshold (e.g., dimensions of a minimum candidate size). In some embodiments, the robotic system 100 can use the size comparison, the separation distance, and/or the association/similarity between the candidate areas and the initial MVR 710 to calculate a confidence level. The confidence level may represent a likelihood that the candidate areas correspond to the same object as the portions corresponding to the initial MVR 710. The robotic system 100 can compare the confidence level to a predetermine threshold to determine whether the candidate areas should be classified as the additional plausible MVR regions 812a-b or a new instance of the initial MVR 710 (e.g., corresponding to a separate object).

Generating a Verified MVR

The robotic system 100 can derive the verified MVR 820 based on combining the initial MVR 710 and the additional plausible MVRs 812a-b. Accordingly, the robotic system 100 can derive a candidate MVR by enlarging the initial MVR 710 to encompass other nearby regions. Thus, the robotic system 100 can increase the likelihood of accurately estimating a complete surface of the unregistered object via the verified MVR 820.

In some embodiments, the robotic system 100 can derive both the verified MVR 820 and the verified MVR 720 (e.g., a result of reducing the initial MVR 710). According to one or more predetermined processes/equations, the robotic system 100 can calculate confidence values for each of the verified MVRs using one or more of the processing parameters described above. The robotic system 100 can select the verified MVR having the greater confidence value as the final MVR.

Alternatively, the robotic system 100 can derive the initial MVR 710 as the final MVR when tests for smaller and/or larger candidate areas are unsuccessful. For example, if the merged MVR is larger than a maximum candidate size, the merged MVR may be rejected and the verified MVR 820 may include the initial MVR 710 without any of the additional plausible MVRs. Also, if the reduced MVR described in FIG. 7 is less than a minimum candidate size, the verified MVR 720 may include the initial MVR 710. In some embodiments, the robotic system 100 can derive the increased MVR first by enlarging the initial MVR 710. The robotic system 100 can then iteratively reduce the increased MVR as described above to derive the final MVR. The robotic system 100 can use the verified MVR to register and/or manipulate the unregistered object as described above.

Figure 9:
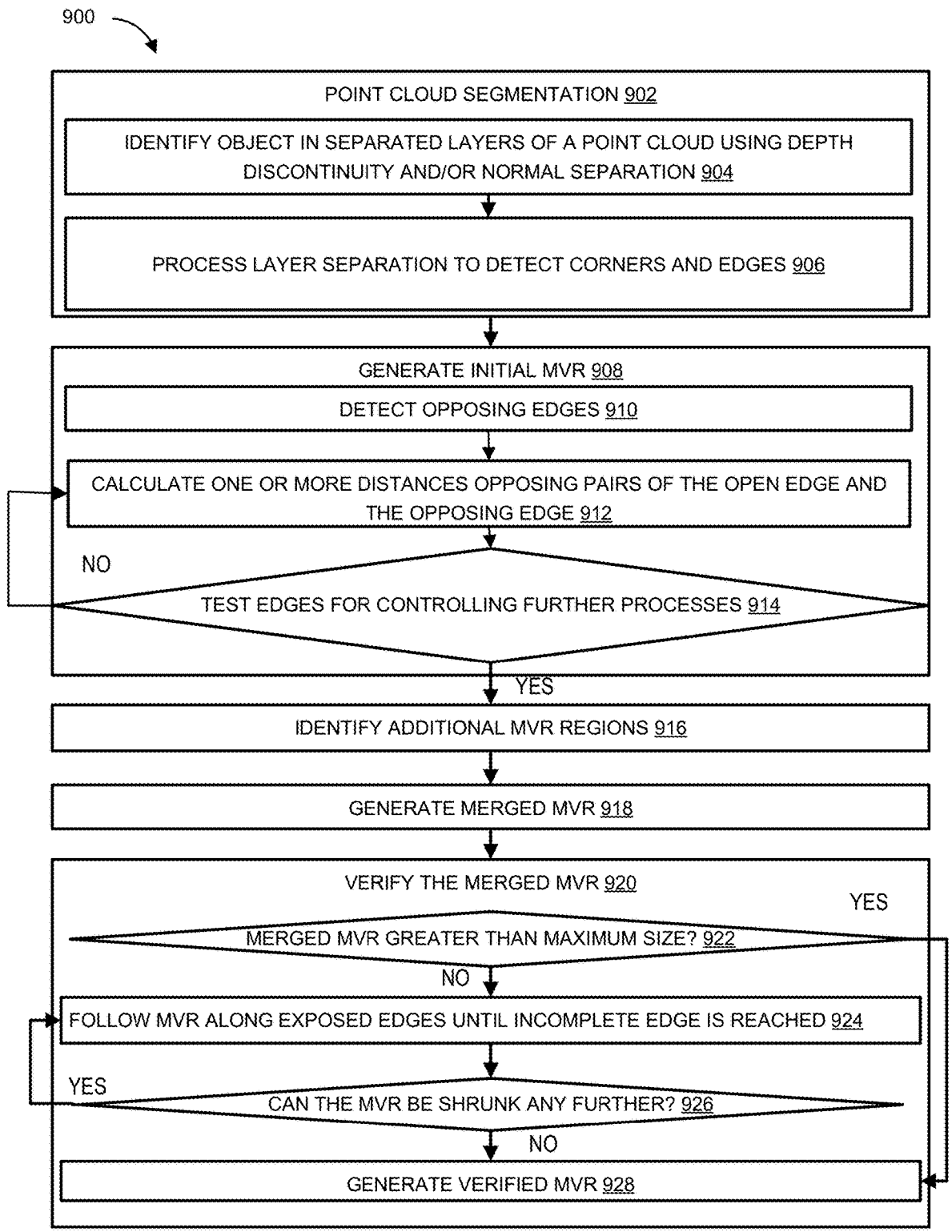
FIG. 9 is a block diagram of a method of operating the robotic system of FIG. 1 in accordance with some embodiments of the present technology.

FIG. 9 illustrates a block diagram of a method 900 of operating the robotic system 100 of FIG. 1 in accordance with some embodiments of the present technology. The method 900 can be for generating an MVR (e.g., the validated MVR) for gripping, manipulating, and/or registering unregistered objects. The method 900 can be implemented based on executing corresponding instructions stored in one or more storage devices with one or more processors.

The method 900 may include point cloud segmentation (block 902). The point cloud segmentation can effectively separate layers (e.g., object surfaces) according to height. The robotic system 100 can implement the point cloud segmentation by analyzing imaging data (e.g., 3D point cloud and/or 2D visual images) from one or more imaging sensors (e.g., the first imaging sensor 212 of FIG. 2). In some embodiments, the imaging data can include a top-view representation of the target object 112 of FIG. 1 and/or the target stack 210 of FIG. 2. In analyzing the imaging data, the robotic system 100 can identify and group adjacent locations/portions of the image data/image output according to various captured characteristics. For example, the robotic system 100 can identify continuous surfaces based on depth measures, colors/brightness, and/or other captured characteristics as described above.

In some embodiments, for example, the method 900 may include identifying an object in separated layers of a point cloud using depth discontinuity and/or normal separation (block 904). For example, the robotic system 100 can analyze the imaging data to identify depth discontinuities across one or more horizontal directions with respect to the top surface of the target stack 210. The depth discontinuities can be determined based on separation of regions/surfaces (e.g., changes in depth values) along directions normal to the identified regions/surfaces. Accordingly, the robotic system 100 can identify continuous surfaces/layers and the corresponding objects.

The method 900 may include processing the separated layers to detect corners and edges (block 906). The robotic system 100 can process the image data and/or the determined surfaces/layers to detect exposed 3D corners (e.g., the exposed outer corners 326 of FIG. 3C) and/or exposed edges (e.g., the exposed edges 322 of FIG. 3C). In some embodiments, for example, the robotic system 100 can identify the exposed edges 322 as locations corresponding to the depth difference. Accordingly, the exposed edges 322 (e.g., open edges) can border or define two sides that have different depth values.

As described above, the robotic system 100 can further derive the exposed outer corners 326 based on identifying locations where the exposed edges 322 intersect at an angle that satisfies one or more predetermined corner thresholds. Accordingly, the resulting exposed outer corners 326 can have one of the quadrants about the corner having consistent or similar depth measures while the remaining three quadrants have differing depth measures. In some instances, such as for objects forming an outer corner of the stack, the depth measures in the surrounding three quadrants may correspond to empty space and have sparse point cloud (e.g., known depth measures) and/or point cloud noise.

In some embodiments, the robotic system 100 can further rank the exposed outer corners 326. For example, the outer corners that are further separated from other layers/surfaces can be ranked/scored higher than corners that are horizontally closer to other surfaces because the outer corners that are further separated from other layers/surfaces can be more accessible for a gripping or transfer operation and/or have a lower possibility of gripping or disturbing adjacent objects. Also, the robotic system 100 can rank or score the exposed outer corners higher relative to the other instances of the exposed outer corners when the corners are further from a center portion of the stack/pallet, when the surrounding space is emptier or closer to noise patterns, and/or when the surface is higher above the ground (e.g., closer to the top-view sensor).

The robotic system 100 can additionally or alternatively determine 2D edges based on 2D/visual image analysis. In some embodiments, the robotic system 100 can use the 2D edges to identify and/or verify the exposed edges 322.

The robotic system 100 can further identify the incomplete edges 712 of FIG. 7 (e.g., the detected lines 422). The incomplete edges 712 may be identified using 2D and/or 3D analysis. As described above, the robotic system 100 can identify the incomplete edges 712 as 2D and/or 3D edges that do not intersect other edges at angles satisfying predetermined corner thresholds, such as between 80°-100°. The incomplete edges 712 can correspond to patterns on object surfaces, actual edges of objects, gaps on the object surfaces, and/or gaps between objects. Accordingly, the robotic system 100 can further process the incomplete edges 712 as described below for deriving the verified MVRs.

The method 900 may include generating an initial MVR (block 908). The robotic system 100 can generate the initial MVR 710 based on the exposed outer corners 326. In some embodiments, the robotic system 100 can select/process the exposed outer corners 326 that are located highest above the ground and/or furthest away from the center before others. The exposed 3D corner and exposed edges together may provide the basis for generating the initial MVR 710. Generating the initial MVR 710 may include processing the separated layers of the point cloud and conducting a further segmentation of each layer (i.e. top most layer) using edges detected from images. In other words, the robotic system 100 can combine the different layers/areas resulting from the 3D segmentations with locations of 2D edges. Using the 2D/visual edge locations, the robotic system 100 can further segment the 3D layers. The robotic system 100 can analyze the resulting segments or areas of the 3D layers to determine whether the segments include at least one exposed outer corner 326 and/or whether the segment dimensions satisfy minimum/maximum thresholds. The robotic system 100 can determine the segments that satisfy one or both of these conditions as the initial MVR 710.

Additionally or alternatively, the robotic system 100 can derive the initial MVR 710 by extending or following from the selected exposed outer corner 326 (e.g., the exposed outer corner 614 of FIG. 6) along the exposed edges 322. While following the edges, the robotic system 100 can detect opposing edges (block 910). For example, the robotic system 100 can incrementally check different locations along the exposed edges 322 to verify whether the followed segment bends or is intersected by another 2D/3D segment to form an angle. In some embodiments, the robotic system 100 can test the identified angle by comparing it against a threshold angle range. As an example, the threshold angle range can correspond to right angles (e.g., 70°-110°) for processing rectangular surfaces and/or boxes. Accordingly, the robotic system 100 can detect edges that oppose or otherwise correspond to (e.g., parallel to) one or more of the exposed edges 322. Also, in some embodiments, the robotic system 100 can ignore intersections with the incomplete edges 712. Accordingly, the robotic system 100 can follow the exposed edges 322 from the exposed outer corner 614 to identify the opposing edges.

Generating the initial MVR may include calculating one or more distances associated with the opposing pairs of the open edge and the opposing edge (block 912). In other words, the robotic system 100 can calculate one or more dimensions of the area defined by the exposed edges 322 and the opposing edges. The robotic system 100 can calculate the dimensions according to a predetermined mapping between portions in the image and real-world locations. Also, the robotic system 100 can use a predetermined equation that calculates real-world dimensions based on the depth measure for the identified edges and/or horizontal distances between the edges in the 2D/3D images.

In some embodiments, as an example, the robotic system 100 can calculate the one or more dimensions first and then test further the intersecting edges. The robotic system 100 can calculate separation between a pairing of the exposed edge 322 and the opposing/intersecting edge at two different locations, such as at two opposing ends of the intersecting edge and/or at other two points separated by a predetermined distance along the edges. The robotic system 100 can identify or verify the intersecting edges as the opposing edges when the two distances are within a threshold range of each other, such as for parallel lines.

The robotic system 100 may test the edges for controlling further processes (decision block 914). For example, the robotic system 100 can test whether the intersecting edges are located within regions defined by the exposed edges. In some embodiments, the robotic system 100 can test based on comparing the depth measures, the color, the brightness, etc. between the exposed edge and the corresponding candidate opposing/intersecting edge. Also, for example, the robotic system 100 can test whether the distance between a pair of edges (e.g., the exposed edge and the corresponding candidate opposing/intersecting edge) satisfies one or more thresholds (e.g., a minimum MVR dimension and/or a maximum MVR dimension). When the candidate intersecting edges fail the test, the robotic system 100 can continue to move along the exposed edges to detect opposing parallel edges (loop back to block 910). The iterative process may be performed until the test conditions are satisfied or until a maximum MVR dimension is reached along the exposed edges.

If the opposite parallel edge (e.g., the opposite parallel edges 724/728 of FIG. 7) satisfies the required condition(s), the method 900 includes identifying additional MVR regions (block 916). This may include expanding outward in the X and Y directions from the initial MVR (e.g., the initial MVR 710) to cover remaining portions of the layer/area. For example, the robotic system 100 can identify the additional plausible MVR regions 812a-b based on analyzing portions of the 2D and/or the 3D images, such as by matching visual characteristics/depth values and verifying/testing the candidate areas as described above.

The method 900 may include generating a merged MVR (block 918). The robotic system 100 may generate the merged MVR by combining the expanded regions (e.g., the additional plausible MVR regions 812a-b of FIG. 8) and the initial MVR 710.

The method 900 may include verifying the merged MVR (block 920). Verifying the merged MVR may include determining whether the merged MVR is greater than a predetermined maximum threshold (block 922). For example, if the merged MVR is larger than a maximum threshold (i.e. corresponding to the dimensions of the maximum candidate size), the robotic system 100 can reject the merged MVR and generate a verified MVR that includes the initial MVR 710 without the additional plausible MVR regions (block 928).

If the merged MVR is less than the maximum threshold, the method 900 may include following the exposed edges until an incomplete edge is reached (block 924). For example, the robotic system 100 can identify a second 3D corner (e.g., a separate instance of the exposed outer corner 326) that is diagonally opposite the reference/starting open 3D corner according to the 3D image data. The robotic system 100 can identify the second 3D corner based on comparing locations of the exposed outer corners 326 relative to the exposed edges and/or the opposite edges. In some embodiments, the robotic system 100 can identify the second 3D corner as the junction of the opposing edges and/or the corner of the merged MVR. The robotic system 100 can start from the second 3D corner and follow the corresponding edges (e.g., the opposing edges) toward the first/initial 3D corner serving as the reference for the initial MVR. While following the corresponding edges, the robotic system 100 can identify other edges (e.g., the detected lines 422 and/or the incomplete edges 712) that intersect and/or are arranged parallel to any of the identified open/opposing edges. When other such edges are found, the robotic system 100 can derive a candidate MVR smaller than the merged MVR and/or smaller than the initial MVR 710.

The robotic system 100 can iteratively follow the edges corresponding to the second 3D corner and adjust/shrink the second candidate MVR (block 926). In some embodiments, the robotic system 100 can stop the iterative process (1) when one or more dimensions of the second candidate MVR violate a minimum threshold and/or a maximum threshold and/or (2) when no incomplete and/or parallel edges exist within the second candidate MVR. When the second candidate MVR cannot be reduced further, the robotic system 100 can generate the verified MVR as the last/smallest instance of the second candidate MVR that satisfied the maximum/minimum threshold(s) (block 928). This may indicate that there are no further incomplete edges remaining within the region between the initial MVR and region defined by edges with length of a minimum candidate size.

The robotic system 100 iteratively identifying and validating 3D edges and 2D edges provides increased accuracy for the MVR. Most of the edges in 2D/3D images may be complete (e.g., identifiable, oriented/arranged parallel and/or perpendicular to each other, and/or intersecting other edges). Accordingly, the robotic system 100 can use the complete edges to separate portions of the image data into areas or layers as described above. The robotic system 100 can further analyze other edges (e.g., 2D edges, incomplete edges, etc.), as actual edges may not be completely/accurately captured in the image data. Increased accuracy of the MVR can provide improved efficiency in manipulating and/or registering unregistered objects. The increased accuracy with the MVR can provide increased likelihood of gripping a single instance of the unrecognized object and/or gripping the unrecognized object closer to the center of mass (CoM) location. Thus, the robotic system 100 can reduce failures associated with inaccurately gripping the unregistered objects.

Example Processing System

Figure 10:
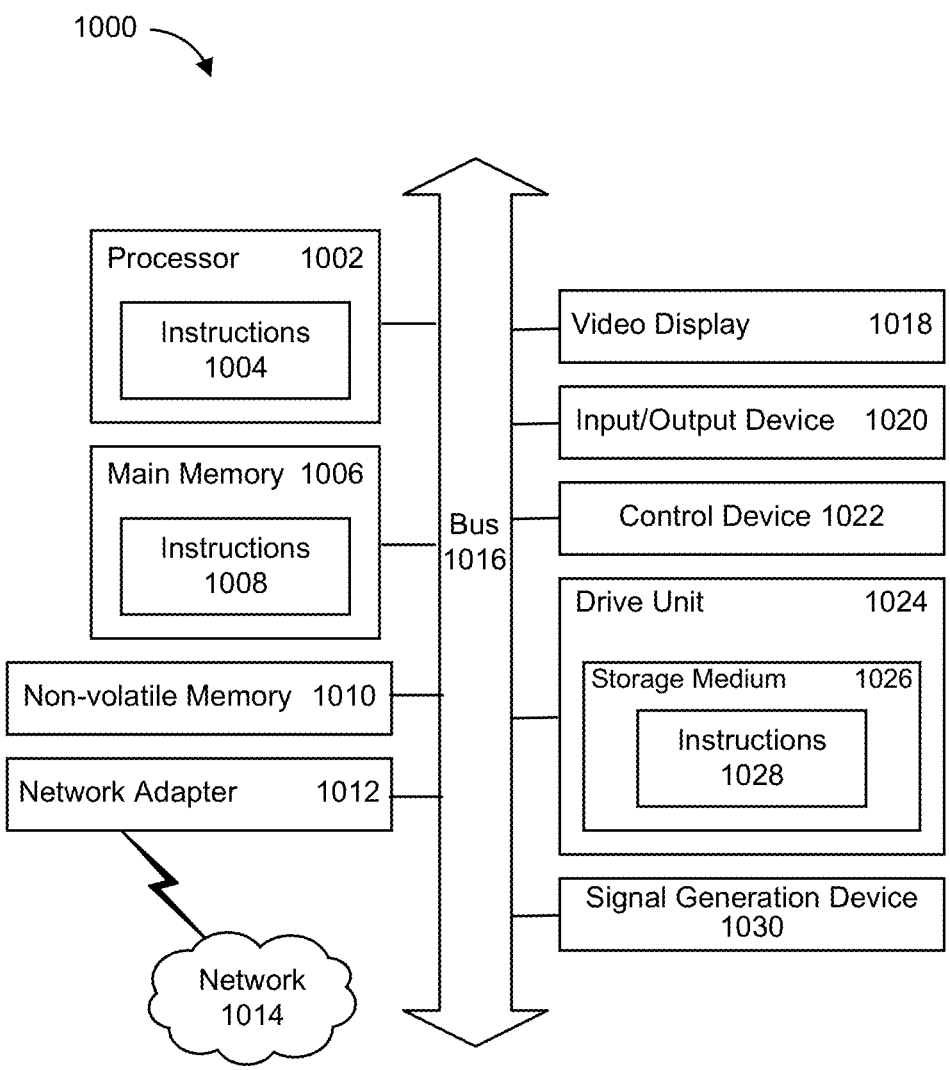
FIG. 10 is a block diagram that illustrates an example of a processing system in which at least some operations described herein can be implemented.

FIG. 10 is a block diagram illustrating an example of a processing system 1000 in which at least some operations described herein can be implemented. As shown in FIG. 10, the processing system 1000 may include one or more central processing units ("processors") 1002, main memory 1006, non-volatile memory 1010, network adapter 1012 (e.g., network interfaces), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents any one or more separate physical buses, point to point connections, or both connected by appropriate bridges, adapters, or controllers. The bus 1016, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 13104 bus, also called "Firewire."

In various embodiments, the processing system 1000 operates as part of a user device, although the processing system 1000 may also be connected (e.g., wired or wirelessly) to the user device. In a networked deployment, the processing system 1000 may operate in the capacity of a server or a client machine in a client-server network environment, or as a peer machine in a peer-to-peer (or distributed) network environment.

The processing system 1000 may be a server computer, a client computer, a personal computer, a tablet, a laptop computer, a personal digital assistant (PDA), a cellular phone, a processor, a web appliance, a network router, switch or bridge, a console, a handheld console, a gaming device, a music player, network-connected ("smart") televisions, television-connected devices, or any portable device or machine capable of executing a set of instructions (sequential or otherwise) that specify actions to be taken by the processing system 1000.

While the main memory 1006, non-volatile memory 1010, and storage medium 1026 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computer, and that, when read and executed by one or more processing units or processors 1002, cause the processing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 1010, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1012 enables the processing system 1000 to mediate data in a network 1014 with an entity that is external to the processing system 1000 through any known and/or convenient communications protocol supported by the processing system 1000 and the external entity. The network adapter 1012 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
receiving one or more image data representative of a target stack including one or more unregistered objects;
identifying an exposed outer corner and exposed edges associated thereto by identifying separated layers in the one or more image data, wherein the exposed outer corner and the corresponding exposed edges represent an unregistered object;
identifying opposing edges that correspond to the exposed edges based on identifying one or more other edges that intersect the exposed edges;
verifying the opposing edges based on comparing an orientation of the opposing edges to the orientation of the exposed edges;
generating an initial minimum viable region (MVR) representative of an area that extends from the exposed outer corner along the exposed edges to the verified opposing edges; and
generating a verified MVR based on adjusting the initial MVR and testing a corresponding result, wherein the verified MVR represents an estimated surface or a portion thereof of one of the unregistered objects.

2. The method of claim 1, wherein: the exposed edges include a first exposed edge and a second exposed edge that define the exposed outer corner; the opposing edges are an initial set of opposing edges that include a first initial opposing edge and a second initial opposing edge, wherein the first initial opposing edge and the second initial opposing edge are determined to be parallel to the first exposed edge and the second exposed edge, respectively; and generating the verified MVR includes: identifying a further opposing edge that intersects the first exposed edge at a location past the second initial opposing edge relative to the exposed outer corner, wherein the further opposing edge is determined to be parallel to the second initial opposing edge and the second exposed edge; identifying an additional plausible MVR region including an area between the opposing edges and the further opposing edge; and testing a candidate MVR that combines the additional plausible MVR region and the initial MVR.

3. The method of claim 2, wherein testing includes verifying whether one or more dimensions of the candidate MVR satisfy a maximum and/or a minimum dimension threshold for MVRs.

4. The method of claim 2, wherein testing includes verifying whether depth measurements, colors, brightness, or a combination thereof for portions of the one or more imaging data corresponding to the additional plausible MVR region and the initial MVR are within a threshold continuity range from each other.

5. The method of claim 2, wherein the verified MVR includes the initial MVR without the additional plausible MVR region when the candidate MVR fans to satisfy one or more predetermined thresholds.

6. The method of claim 1, wherein:
the exposed edges include a first exposed edge and a second exposed edge that define the exposed outer corner;
the opposing edges are an initial set of opposing edges that include a first initial opposing edge and a second initial opposing edge, wherein the first initial opposing edge and the second initial opposing edge are determined to be parallel to the first exposed edge and the second exposed edge, respectively; and generating the verified MVR includes:
  identifying a further opposing edge between the second initial opposing edge and the exposed outer corner, wherein the further opposing edge is determined to be parallel to the second initial opposing edge and the second exposed edge;
  identifying a reduced candidate MVR as an area within the initial MVR that is bounded by the further opposing edge instead of the second initial opposing edge; and
  testing the reduced candidate MVR.

7. The method of claim 6, wherein generating the verified MVR includes setting the reduced candidate MVR as the verified MVR when one or more dimensions of the candidate MVR satisfy a maximum and/or a minimum dimension threshold for MVRs.

8. The method of claim 6, wherein identifying the further opposing edge includes:
  identifying a second corner associated with the initial set of opposing edges;
  searching for an intersection with the further opposing edge while moving away from the second corner along the first initial opposing edge; and
  testing an orientation of the further opposing edge based on verifying (1) that an angle between the further opposing edge and the first initial opposing edge is within a threshold range representative of a right angle and/or (2) that a set of distances between multiple sets of corresponding points along the further opposing edge and the second exposed edge are within a threshold range from each other.

9. The method of claim 6, wherein:
  the one or more image data include (1) a 3D imaging output including depth measures for locations along a horizontal plane and (2) a 2D imaging output visually representing the target stack along the horizontal plane;
  identifying the exposed edges includes:
    identifying each of the separated layers as a set of adjacent locations along the horizontal plane of the 3D imaging output that have the depth measures within a threshold range from each other, and
    identifying peripheral boundaries of the separated layers as 3D edges;
  identifying the exposed outer corner includes selecting an intersection formed by a set of the 3D edges, wherein the set of 3D edges are the exposed edges; and
  identifying the further opposing edge includes identifying an incomplete edge and/or a detected line based on analyzing the 3D imaging output, the 2D imaging output, or a combination thereof.

10. The method of claim 9 wherein generating the verified MVR includes:
  identifying a 3D edge based on analyzing the 3D imaging output, wherein the 3D edge (1) is closer towards the exposed outer corner along the first exposed edge than the second initial opposing edge and (2) is parallel to the second initial opposing edge and the second exposed edge;
  adjusting the initial MVR to additionally include an area between the second initial opposing edge and the 3D edge;
  wherein:
    the further opposing edge is a result of analyzing portions of the 2D imaging output corresponding to the adjusted initial MVR; and
    the reduced candidate MVR includes the area within the adjusted initial MVR.

11. A robotic system, comprising:
  at least one processor; and
  at least one memory device connected to the at least one processor and having stored thereon instructions, executable by the processor, for:
    receiving one or more image data representative of a target stack including one or more unregistered objects;
    identifying an exposed outer corner and exposed edges associated thereto based on analyzing the one or more image data, wherein the exposed outer corner and the corresponding exposed edges represent an unregistered object;
    generating an initial minimum viable region (MVR) representative of an area that extends from the exposed outer corner along the exposed edges to opposing edges; and
    generating a verified MVR based on adjusting the initial MVR and testing a corresponding result.

12. The robotic system of claim 11, wherein the at least one memory device includes instructions for:
  receiving the one or more image data including 3D depth measures;
  identifying the exposed outer corner based on:
    identifying surfaces based on the 3D depth measures, wherein each of the surface include a set of adjacent locations having the 3D depth measures within a threshold continuity range,
    identifying 3D edges based on the identified surfaces, wherein the 3D edges correspond to lateral boundaries of the surfaces,
    identifying the exposed outer corner as a junction between a first 3D edge and a second 3D edge bounding one of the surfaces, wherein the pair of the 3D edges correspond to the exposed edges; and
  generating the initial MVR based on:
    identifying a first opposing edge while moving along the second 3D edge away from the exposed outer corner, wherein the first opposing edge is an instance of the 3D edges associated with the first 3D edge; and
    identifying a second opposing edge while moving along the first 3D edge away from the exposed outer corner, wherein the second opposing edge is an instance of the 3D edges associated with the second 3D edge,
      wherein the initial MVR includes an area bounded by the exposed edges and the first and second opposing edges.

13. The robotic system of claim 12, wherein the at least one memory device includes instructions for generating the verified MVR based on:
  identifying a further opposing edge while moving from the second opposing edge along the first 3D edge and away from the exposed outer corner, wherein the further opposing edge, the second 3D edge, and the second opposing edges are determined to be parallel to each other; and
  testing a candidate MVR that combines the initial MVR and an area between further opposing edge and the second opposing edge according to a maximum and/or a minimum dimension threshold.

14. The robotic system of claim 13, wherein the at least one memory device includes instructions for generating the verified MVR including the initial MVR, without the area between further opposing edge and the second opposing edge, when the candidate MVR fails to satisfy the maximum and/or the minimum dimension threshold.

15. The robotic system of claim 13, wherein the at least one memory device includes instructions for generating the verified MVR including the candidate MVR when the candidate MVR satisfies the maximum and/or the minimum dimension threshold.

16. A tangible, non-transitory computer-readable medium having processor instructions stored thereon that, when executed by a processor, cause the processor to: receive one or more image data representative of a target stack including one or more unregistered objects;
identify an exposed outer corner and exposed edges associated thereto based on analyzing the one or more image data, wherein the exposed outer corner and the corresponding exposed edges represent an unregistered object;
generate an initial minimum viable region (MVR) representative of an area that extends from the exposed outer corner along the exposed edges to opposing edges; and
generate a verified MVR based on adjusting the initial MVR and testing a corresponding result.

17. The non-transitory computer-readable medium of claim 16, further causing the processor to: receive the one or more image data including 3D depth measures; identify the exposed outer corner and the exposed edges based on analyzing the one or more image data according to 3D depth measures; generate the initial MVR based on identifying a first opposing edge and a second opposing edge, wherein the first opposing edge is an instance of the exposed edges associated with a first exposed edge of the exposed edges and the second opposing edge associated with a second exposed edge of the exposed edges; and wherein: the initial MVR includes an area bounded by the exposed edges and the first and second opposing edges.

18. The non-transitory computer-readable medium of claim 17, further causing the processor to generate the verified MVR based on: identifying a further opposing edge between the second initial opposing edge and the exposed outer corner, wherein the further opposing edge, the second exposed edge, and the second initial opposing edge are determined to be parallel to each other; and identifying a reduced candidate MVR as an area within the initial MVR that is bounded by the further opposing edge instead of the second initial opposing edge.

19. The non-transitory computer-readable medium of claim 18, further causing the processor to identify the further opposing edge based on: identifying a second corner diagonally opposite the exposed outer corner; searching for the further opposing edge while moving away from the second corner along the first initial opposing edge; and determining whether the further opposing edge is parallel to the second exposed edge based on an angle between the further opposing edge and the first initial opposing edge and/or a set of distances between multiple sets of corresponding points along the further opposing edge and the second exposed edge.

20. The non-transitory computer-readable medium of claim 16, further causing the processor to generate the verified MVR based on: enlarging the initial MVR according to a first additional edge beyond one of the exposed edges from the exposed outer corner, wherein the first additional edge includes a second corner opposite the exposed outer corner; identifying a further opposing edge based on evaluating one or more portions within the image data from the second corner to the exposed outer corner; and generate the verified MVR as an area within the initial MVR that is bounded by the further opposing edge instead of the second initial opposing edge.

* * * * *